United States Patent
Harris, III

(10) Patent No.: US 10,243,183 B1
(45) Date of Patent: Mar. 26, 2019

(54) MODULAR BATTERY

(71) Applicant: Thor Trucks Inc., North Hollywood, CA (US)

(72) Inventor: John Henry Harris, III, San Gabriel, CA (US)

(73) Assignee: Thor Trucks Inc., North Hollywood, CA (US)

(*) Notice: Subject to any disclaimer, the term of this patent is extended or adjusted under 35 U.S.C. 154(b) by 0 days.

(21) Appl. No.: 15/948,451

(22) Filed: Apr. 9, 2018

Related U.S. Application Data

(60) Provisional application No. 62/626,042, filed on Feb. 3, 2018.

(51) Int. Cl.
| | |
|---|---|
| *H01M 2/10* | (2006.01) |
| *H01M 2/12* | (2006.01) |
| *H01M 2/02* | (2006.01) |
| *H01M 10/0525* | (2010.01) |

(52) U.S. Cl.
CPC ....... *H01M 2/1077* (2013.01); *H01M 2/1083* (2013.01); *H01M 10/0525* (2013.01); *H01M 2220/20* (2013.01)

(58) Field of Classification Search
CPC ............ H01M 2/10; H01M 2/02; H01M 2/12; H01M 10/613; H01M 10/6557
See application file for complete search history.

(56) References Cited

U.S. PATENT DOCUMENTS

| | | | |
|---|---|---|---|
| 6,399,238 B1 * | 6/2002 | Oweis | H01M 2/1077 429/100 |
| 6,406,812 B1 * | 6/2002 | Dreulle | H01M 2/1083 180/68.5 |
| 9,525,291 B1 | 12/2016 | Huynh et al. | |
| 9,595,705 B1 | 3/2017 | Buckhout | |
| 9,692,095 B2 | 6/2017 | Harris | |
| 9,692,096 B2 | 6/2017 | Harris | |
| 2008/0003495 A1 * | 1/2008 | Shimizu | H01M 2/1077 429/99 |
| 2010/0000816 A1 | 1/2010 | Okada | |
| 2012/0048630 A1 | 3/2012 | Nishiura et al. | |
| 2012/0148889 A1 | 6/2012 | Fuhr et al. | |
| 2012/0177970 A1 | 7/2012 | Marchio et al. | |
| 2012/0247848 A1 | 10/2012 | Kosaka et al. | |
| 2012/0282507 A1 * | 11/2012 | Andre | B60K 1/04 429/100 |
| 2013/0164577 A1 * | 6/2013 | Insana | H01M 2/1077 429/72 |

(Continued)

*Primary Examiner* — Kenneth J Douyette
(74) *Attorney, Agent, or Firm* — Arent Fox LLP

(57) ABSTRACT

Aspects of a modular clip for an electric battery module, a battery module comprising multiple such modular clips, and a battery pack comprising multiple battery modules are provided. The modular clip includes a housing configured to receive a plurality of battery cells. The housing includes a clip shell. The clip shell includes a base portion, a first wall, and a second wall. The base portion includes a plurality of bottom cell recesses, where each of the plurality of bottom cell recesses is configured to receive a battery cell. The modular clip may further comprise at least one interconnect plate. The modular clip may further comprise a retainer plate including a plurality of top cell recesses, where the plurality of top cell recesses are aligned corresponding to an alignment of the plurality of bottom cell recesses.

30 Claims, 20 Drawing Sheets

(56) References Cited

U.S. PATENT DOCUMENTS

| | | | |
|---|---|---|---|
| 2014/0205878 A1 | 7/2014 | Ohgitani et al. | |
| 2016/0197386 A1* | 7/2016 | Moon | H01M 2/1077 |
| | | | 429/120 |
| 2017/0001584 A1 | 1/2017 | Harris et al. | |
| 2017/0003082 A1 | 1/2017 | Harris | |
| 2017/0005303 A1 | 1/2017 | Harris | |
| 2017/0005304 A1 | 1/2017 | Harris | |
| 2017/0005305 A1 | 1/2017 | Harris | |
| 2017/0005315 A1 | 1/2017 | Harris et al. | |
| 2017/0005319 A1 | 1/2017 | Rong | |
| 2017/0005376 A1 | 1/2017 | Harris et al. | |
| 2017/0005377 A1 | 1/2017 | Rong | |
| 2017/0005378 A1 | 1/2017 | Rong | |
| 2017/0005380 A1 | 1/2017 | Harris | |
| 2017/0005384 A1 | 1/2017 | Harris et al. | |
| 2017/0025657 A1 | 1/2017 | Reinshagen et al. | |
| 2017/0092999 A1 | 3/2017 | Tarlau et al. | |
| 2017/0133644 A1* | 5/2017 | Robert | H01M 10/613 |
| 2017/0217318 A1 | 8/2017 | Kowalewski | |
| 2017/0244141 A1 | 8/2017 | Weicker | |
| 2017/0253142 A1 | 9/2017 | Buckhout | |
| 2017/0256771 A1 | 9/2017 | Buckhout et al. | |
| 2017/0256826 A1 | 9/2017 | Hong et al. | |
| 2017/0279104 A1 | 9/2017 | Beverley et al. | |
| 2017/0288202 A1 | 10/2017 | Tarlau et al. | |
| 2017/0288285 A1 | 10/2017 | Buckhout et al. | |
| 2017/0288286 A1 | 10/2017 | Buckhout et al. | |
| 2017/0298807 A1 | 10/2017 | Gubel et al. | |
| 2017/0338527 A1 | 11/2017 | Walton | |
| 2018/0006341 A1 | 1/2018 | Iqra et al. | |
| 2018/0095139 A1 | 4/2018 | Buckhout, Sr. et al. | |
| 2018/0097265 A1 | 4/2018 | Tarlau et al. | |

\* cited by examiner

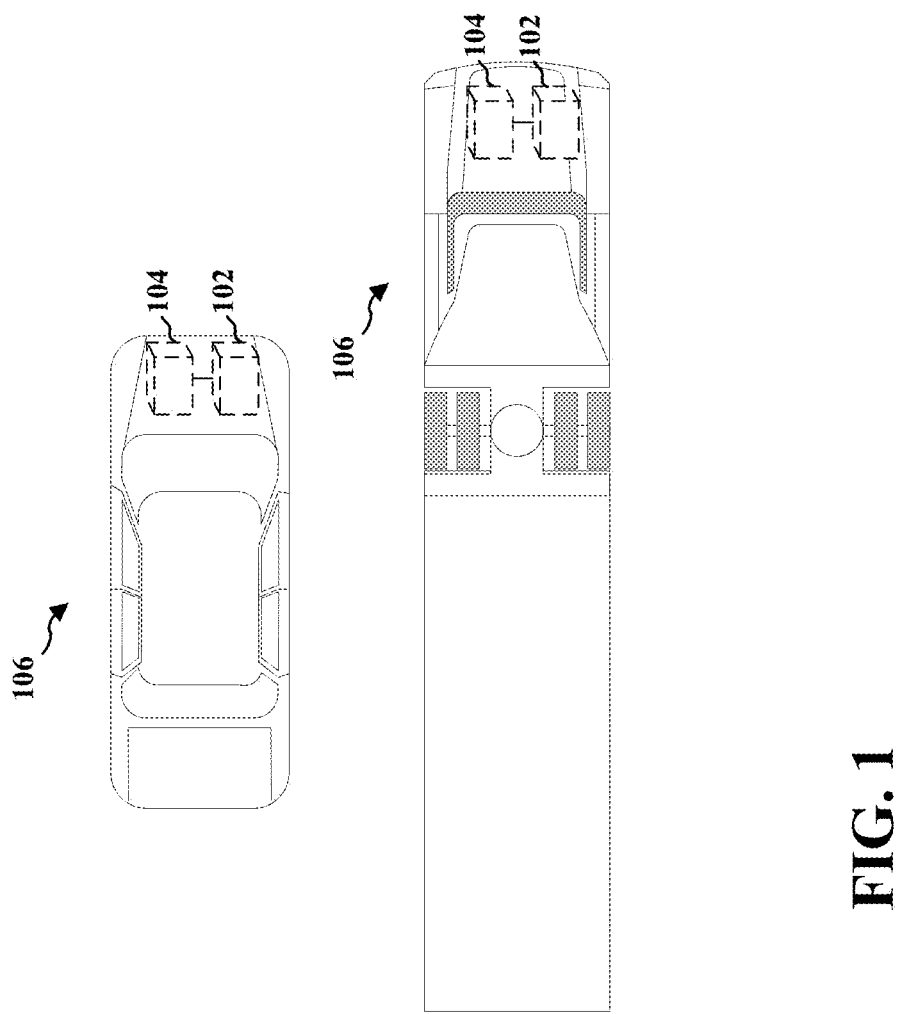
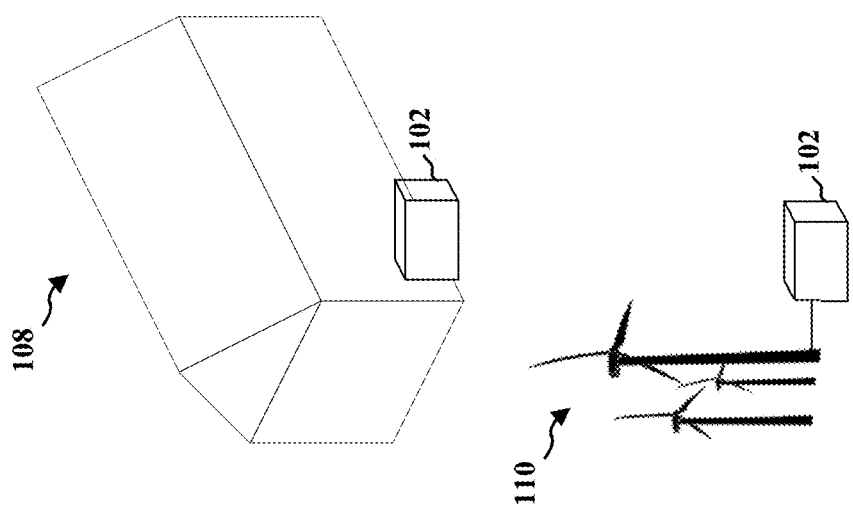
FIG. 1

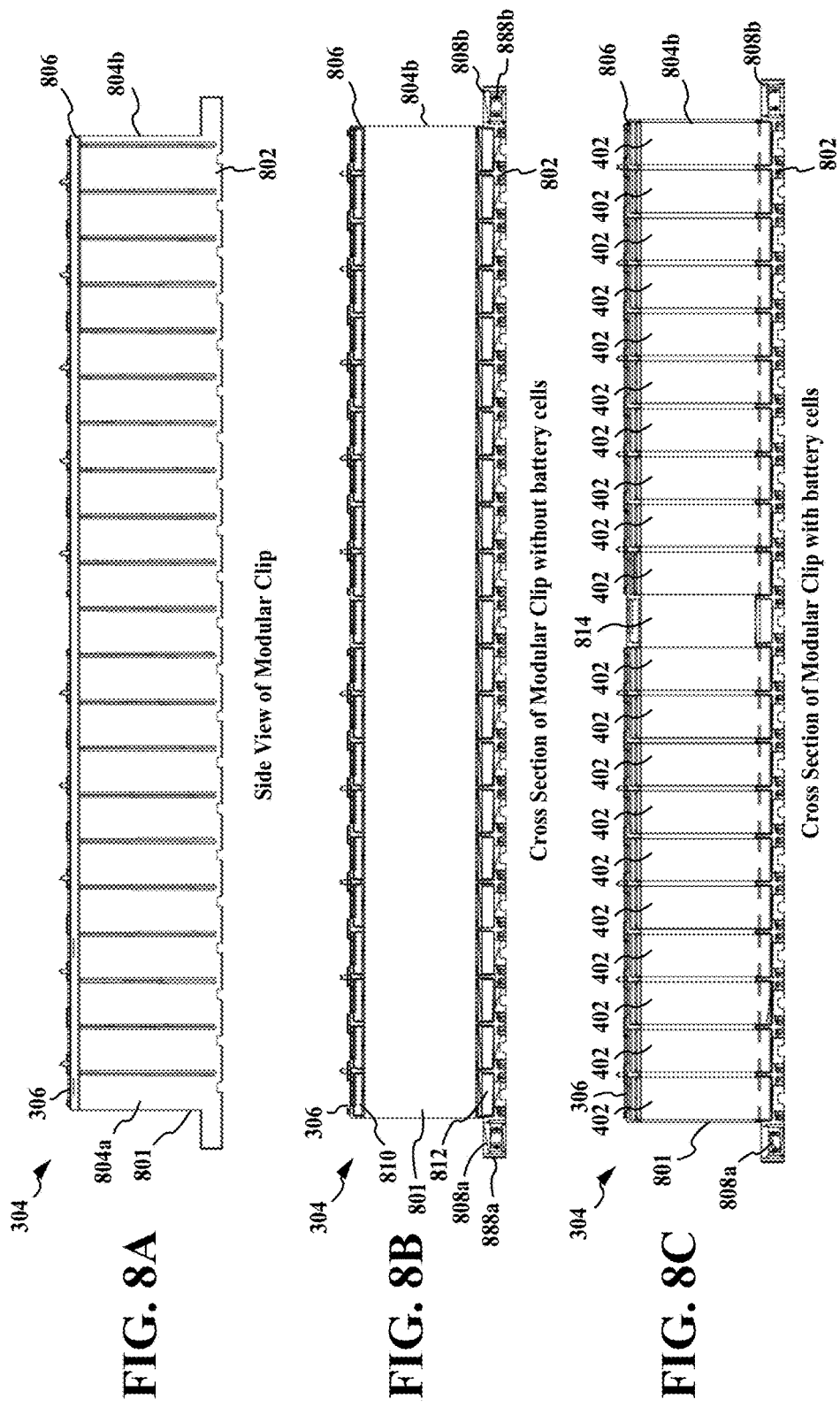

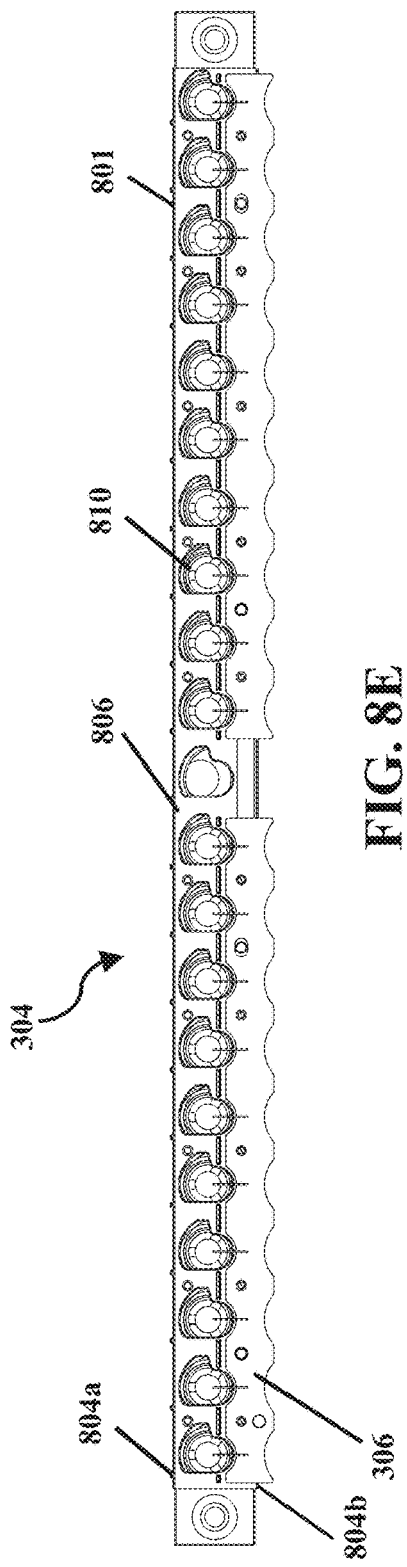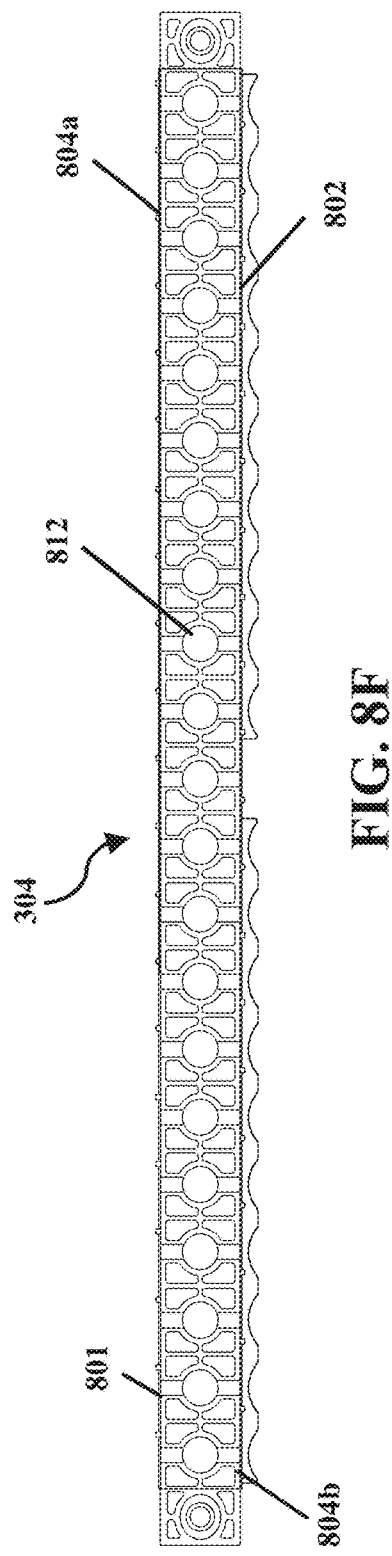
FIG. 8E
FIG. 8F

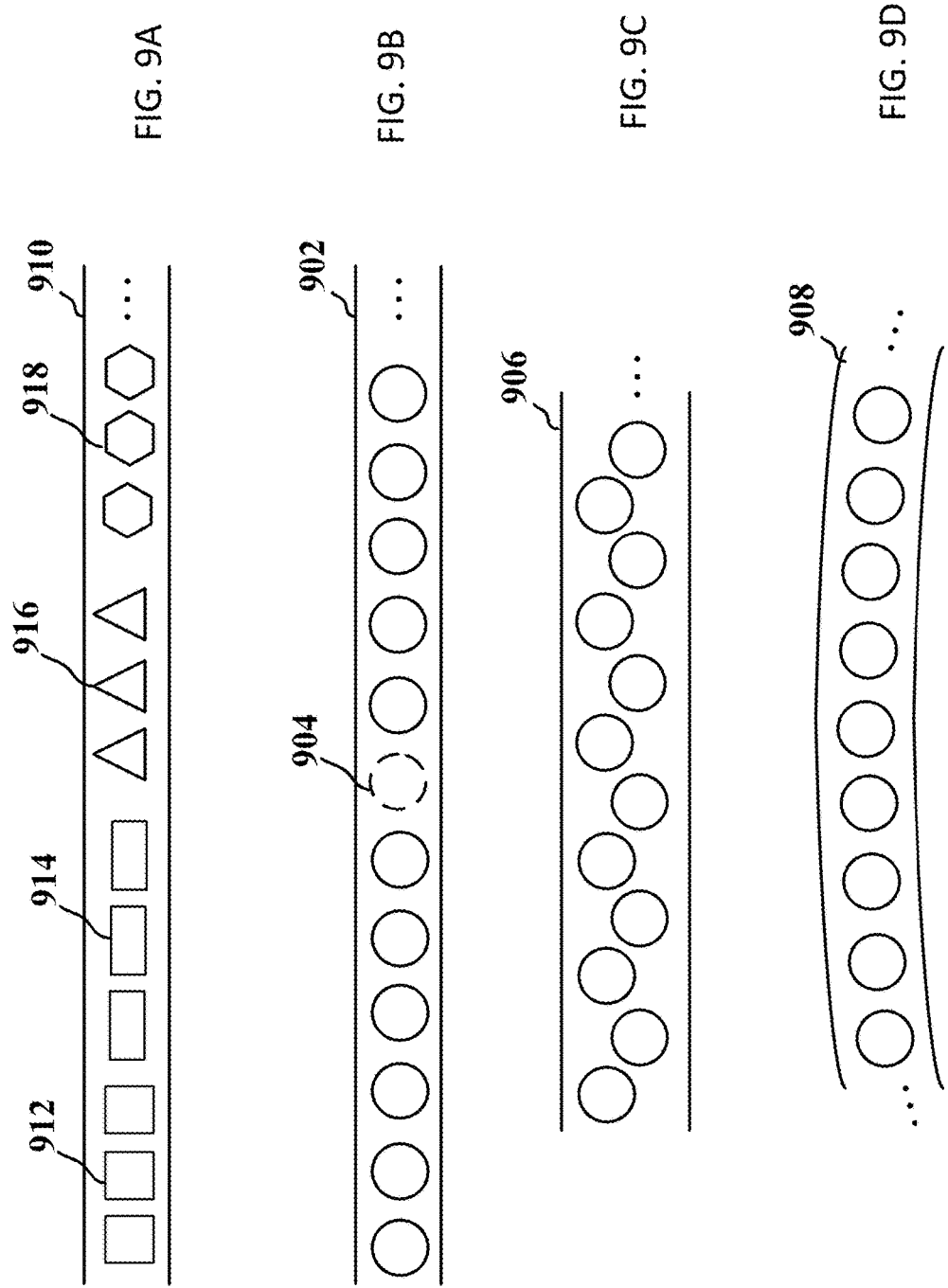

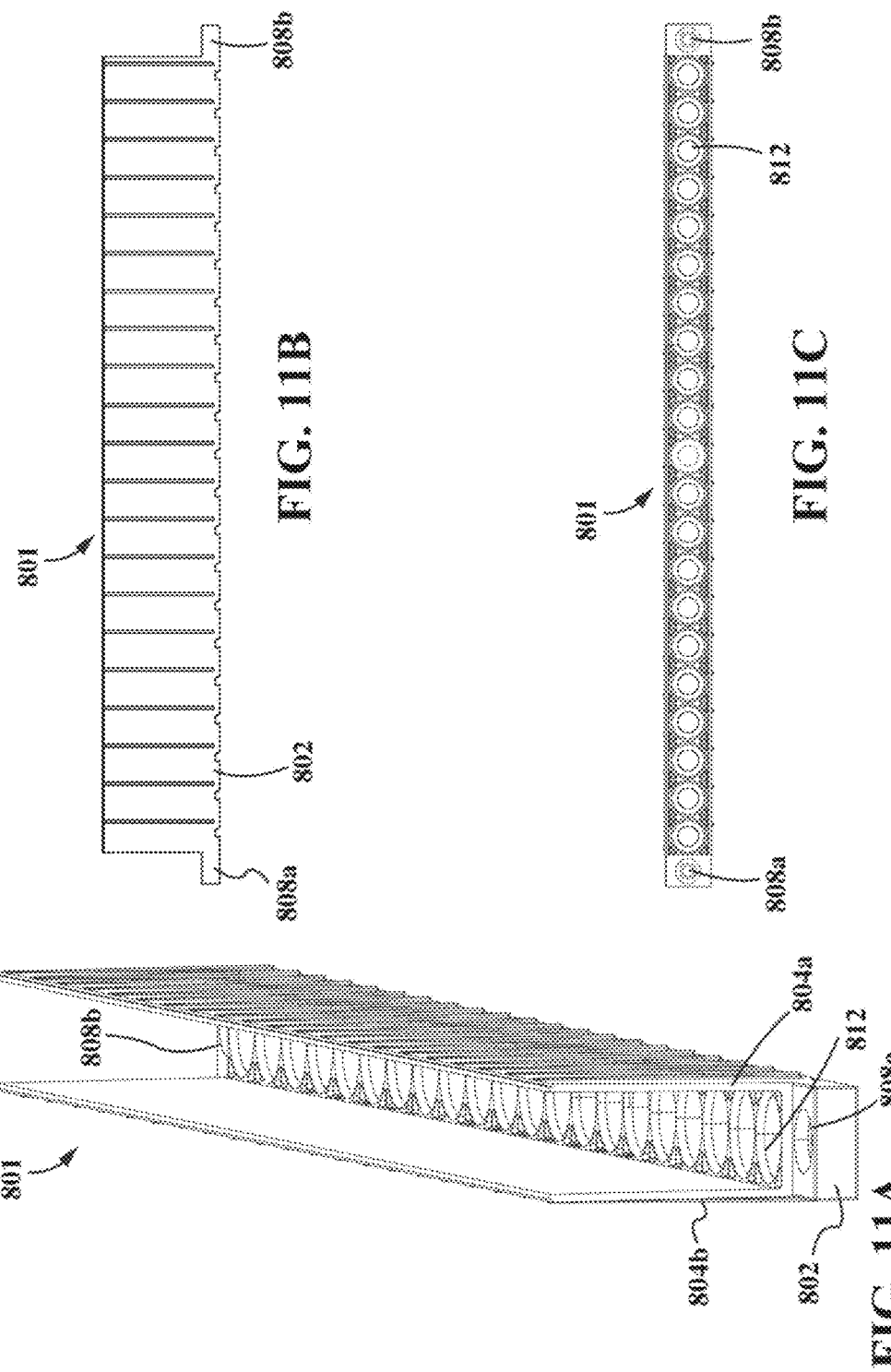

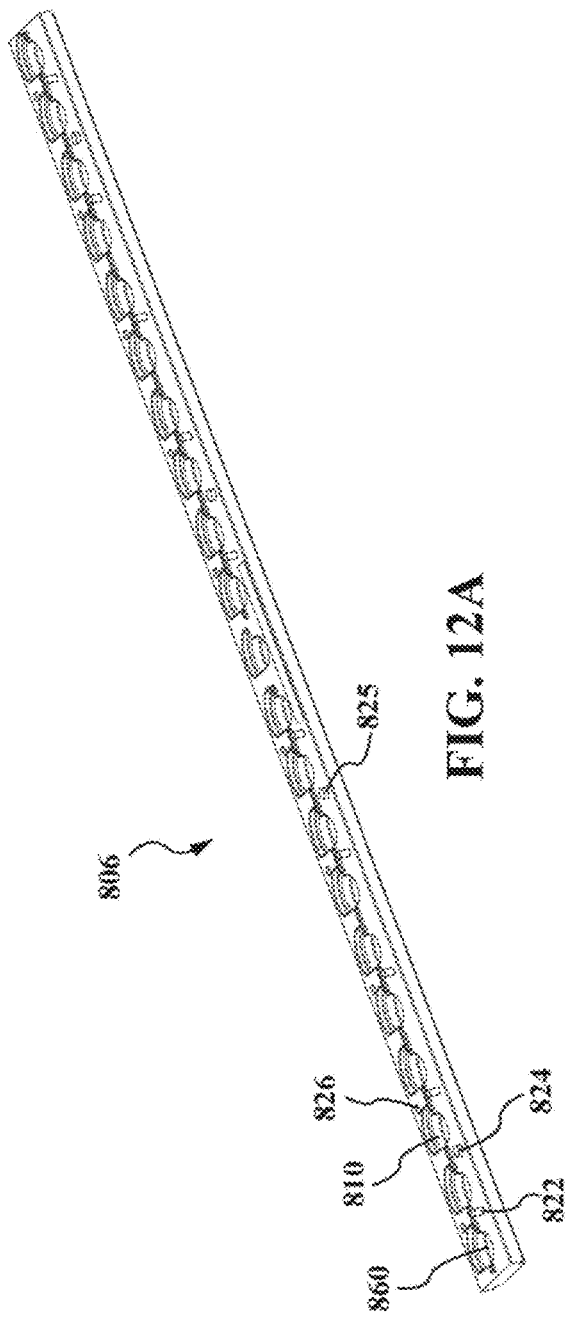
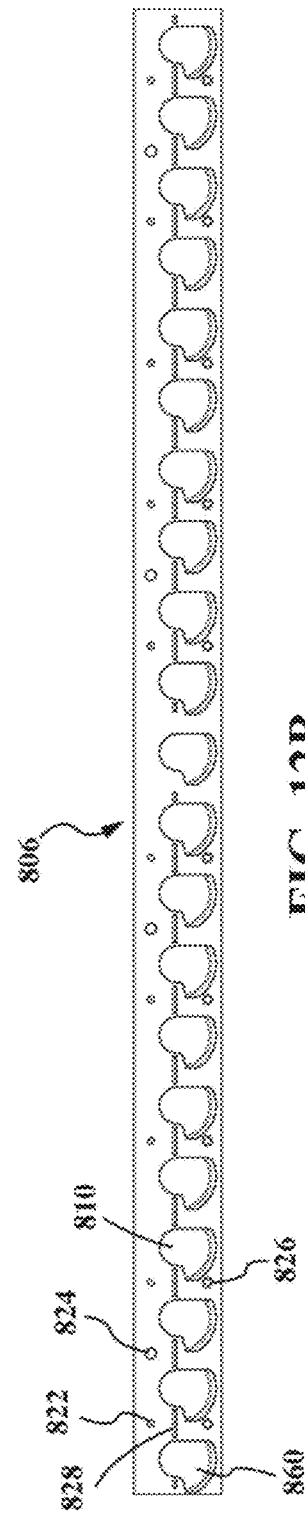
FIG. 12A
FIG. 12B

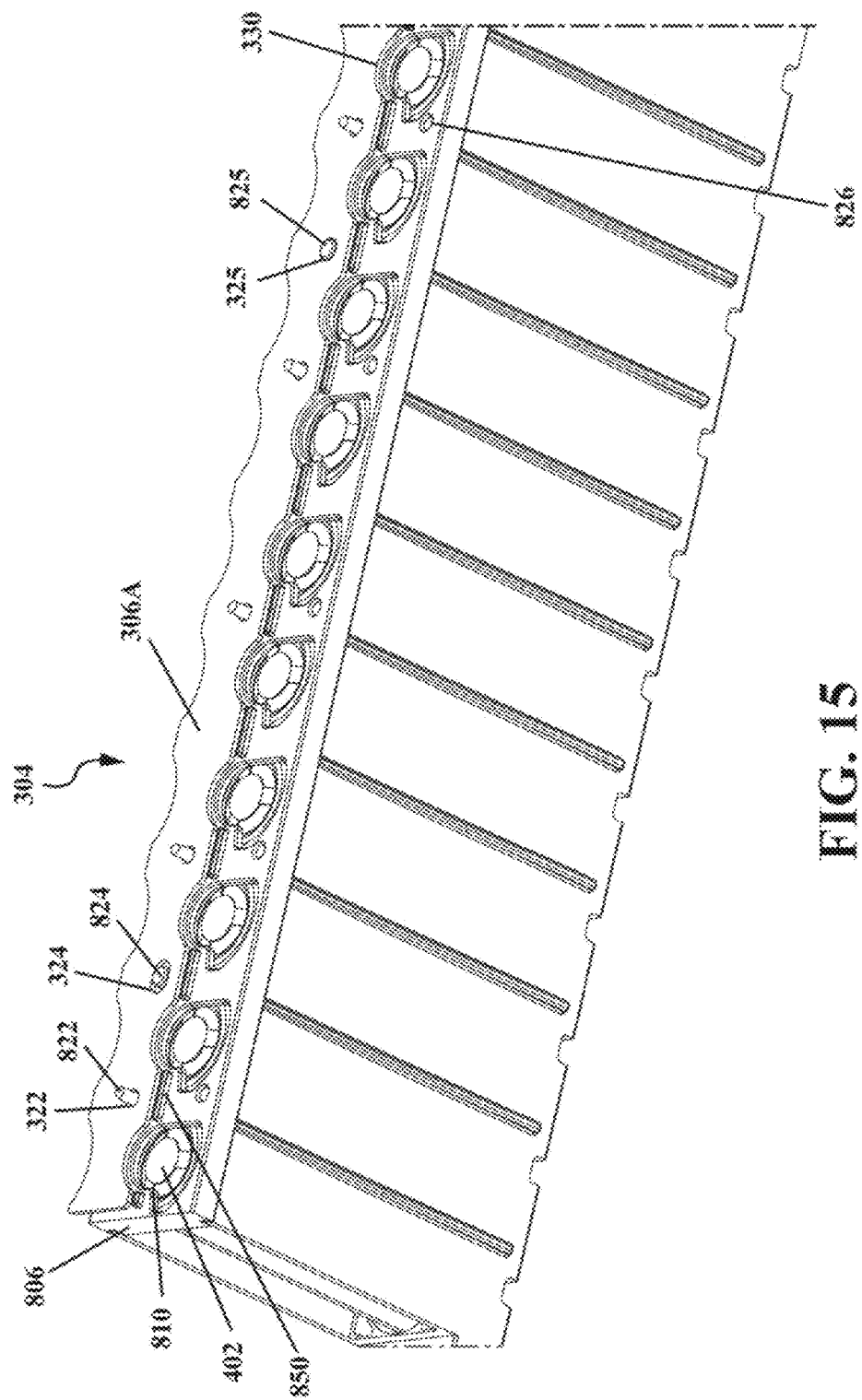

MODULAR BATTERY

CROSS-REFERENCE TO RELATED APPLICATION

This application claims the benefit of U.S. Provisional Application Ser. No. 62/626,042, entitled "Modular Battery" and filed on Feb. 3, 2018, which is expressly incorporated by reference herein in its entirety.

BACKGROUND

Field

Aspects of the present disclosure relate generally to an electric battery module and an electric battery pack with modular design.

Description of the Related Art

Electric batteries may be used in a number of applications. As one example, electric batteries may be used to power electric vehicles in place of a combustion engine in order to reduce fuel consumption and vehicle emissions pollution. Electric vehicles are environmental friendly and do not exhaust any byproducts. Currently, car manufacturers are focusing on the development of battery powered electric vehicles for mass markets. One of the key challenges of electric vehicles is the battery pack design. The auto industry places demands on the power density, energy density and safety of the batteries and push for the development of batteries that combine high performance with low costs. However, the conventional battery pack design is not adapted for mass assembly and production. The manual assembly and production of the battery pack contributes to the high cost of electrical vehicles.

Electric batteries may also be used for energy storage systems, e.g., to store energy for utilities and/or to supply power to a residential or commercial buildings. Thus, electric batteries with high performance and low manufacturing costs are desirable for both mobile applications as well as stationary energy storage applications.

There exists a need for further improvement in electric battery technology. Specifically, there exists a need to develop a high performance and low cost battery pack in order to ramp up electric vehicles production further and target the mass market.

SUMMARY

In light of the above described problems, aspects presented herein provide a modular clip for an electric battery module. The modular clip is configured to be a sub-module of a battery module, e.g., within a battery pack.

In an aspect of the disclosure, a modular clip for a battery module is provided. The modular clip includes a housing configured to receive a plurality of battery cells. The housing includes a clip shell. The clip shell includes a base portion, a first wall extending from the base portion, and a second wall extending from the base portion and spaced from the first wall. The base portion may also be referred to as a bottom cell retainer. The base portion includes a plurality of bottom cell recesses where each of the plurality of bottom cell recesses configured to receive a battery cell. The modular clip is configured to be a sub-module of the battery module. For example, the plurality of bottom cell recesses may be are aligned along a first linear direction. For example, the modular clip may further comprise at least one interconnect plate configured to connect at least a subset of the plurality of battery cells to a controller board. For example, the modular clip may further comprises a retainer plate including a plurality of top cell recesses, where the plurality of top cell recesses are aligned corresponding to an alignment of the plurality of bottom cell recesses. Each of the plurality of bottom cell recesses may comprise an opening extending through the base portion, and each of the plurality of top cell recesses may comprise an opening to facilitate an electrical connection between a battery cell and the interconnect plate.

In another aspect of the disclosure, a battery module is provided. The battery module includes a plurality of modular clips. Each modular clip includes a housing configured to receive a plurality of battery cells. The housing includes a clip shell. The clip shell includes a base portion, a first wall extending from the base portion, and a second wall extending from the base portion and spaced from the first wall. The base portion may also be referred to as a bottom cell retainer. The base portion includes a plurality of bottom cell recesses, where each of the plurality of bottom cell recesses configured to receive a battery cell. The modular clip is configured to be a sub-module of the battery module. The plurality of bottom cell recesses may be are aligned along a first linear direction. The modular clip may further comprises at least one interconnect plate configured to connect at least a subset of the plurality of battery cells to a controller board. The modular clip may further comprises a retainer plate including a plurality of top cell recesses, where the plurality of top cell recesses are aligned corresponding to an alignment of the plurality of bottom cell recesses. The battery module may further comprise at least one controller board coupled to the at least one interconnect plate. The battery module may comprise multiple electrical modules sharing the same plurality of modular clips.

In another aspect, a battery pack is provided, the battery pack comprising multiple battery modules, each battery module including a plurality of modular clips. Each modular clip is configured to receive a plurality of battery cells. Each modular clip includes a housing configured to receive a plurality of battery cells. The housing includes a clip shell. The clip shell includes a base portion, a first wall, and a second wall. The base portion may also be referred to as a bottom cell retainer. The base portion includes a plurality of bottom cell recesses, where each of the plurality of bottom cell recesses configured to receive a battery cell. The modular clip is configured to be a sub-module of the battery module. The plurality of bottom cell recesses may be aligned along a first linear direction. The modular clip may further comprise at least one interconnect plate configured to connect at least a subset of the plurality of battery cells to a controller board. The modular clip may further comprise a retainer plate including a plurality of top cell recesses, where the plurality of top cell recesses are aligned corresponding to an alignment of the plurality of bottom cell recesses. The battery module may further comprise at least one controller board coupled to the at least one interconnect plate. The battery module may comprise multiple electrical modules sharing the same plurality of modular clips, where the multiple electrical modules are coupled via a bus bar.

The battery pack having battery modules with modular clips disclosed herein have numerous advantageous over conventional battery packs. For example, because each modular clip is configured to be a sub-module of the battery module, and each modular clip can be mass produced by automatic assembly lines, the assembly and production of the battery packs can be facilitated, resulting in significant cost reduction. For another example, modular clips can provide easy service ability to replace a worn, damaged, or defective battery or submodule. In the event of battery failure, instead of replacing an entire battery module, only one modular clip may be replaced. Notably, the modular clips for battery modules can improve the performance and reduce the cost of the battery pack. Specifically, the battery pack having battery modules with modular clips can help to ramp up electric battery production, whether for electric vehicles or energy storage, in order to reach the mass market.

Additional advantages and novel features of aspects of the present invention will be set forth in part in the description that follows, and in part will become more apparent to those skilled in the art upon examination of the following or upon learning by practice thereof.

BRIEF DESCRIPTION OF THE DRAWINGS

FIG. 1 illustrates example systems including an electric battery pack, in accordance with aspects presented herein.

FIG. 8A illustrates a side view of a modular clip, in accordance with aspects presented herein.

FIG. 8B illustrates a cross section view of the modular clip in FIG. 8A without battery cells, in accordance with aspects presented herein.

FIG. 8C illustrates a cross section view of the modular clip in FIG. 8A with battery cells, in accordance with aspects presented herein.

FIG. 8E illustrates a top view of the modular clip in FIG. 8A, in accordance with aspects presented herein.

FIG. 8F illustrates a bottom view of the modular clip in FIG. 8A, in accordance with aspects presented herein.

FIG. 9A illustrates a modular clip having different examples of prismatic batteries, in accordance with aspects presented herein.

FIG. 9B illustrates an example modular clip configuration having a single linear row of cells of any number, in accordance with aspects presented herein.

FIG. 9C illustrates an example modular clip being configured to receive two staggered rows of battery cells, in accordance with aspects presented herein.

FIG. 9D illustrates an example modular clip 906 with curved walls, in accordance with aspects presented herein.

FIG. 11A illustrates a perspective view of an example modular clip shell, in accordance with aspects presented herein.

FIG. 11B illustrates a side view of the example modular clip shell in FIG. 10A, in accordance with aspects presented herein.

FIG. 11C illustrates a top view of the example modular clip shell in FIG. 10A, in accordance with aspects presented herein.

FIG. 12A illustrates a perspective view of an example retainer plate, in accordance with aspects presented herein.

FIG. 12B illustrates a top view of the retainer plate in FIG. 11A, in accordance with aspects presented herein.

FIG. 15 illustrates a retainer plate having a plurality of heat stakes and locating buttons, in accordance with aspects presented herein.

DETAILED DESCRIPTION

Figure 2B:
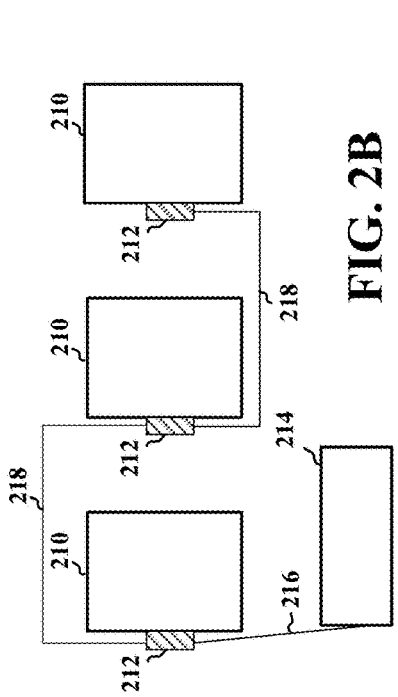
FIGS. 2A, 2B, and 2C illustrate example aspects of a battery pack, in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Several aspects of electric batteries, battery packs, battery modules, and modular sub-components of battery modules will now be presented with reference to various examples.

FIG. 1 illustrates examples of systems that may include an electric battery pack 102 in accordance with the aspects presented herein. The battery pack may be comprised in an energy storage system for commercial and/or residential buildings 108. Energy storage systems may be used to store energy for utilities and/or to supply power to a residential or commercial building(s). Energy storage systems may be a component of a power plant or power generation system, e.g., for utilities. FIG. 1 illustrates a power generation system 110 having battery pack 102 as part of an energy storage system. While wind turbines are illustrated for the power generation system 110, solar and other forms of power generation are equally application.

The battery pack 102 may also be comprised within an electric vehicle and coupled to an electric motor 104 to drive the vehicle 106. As illustrated, the battery pack 102 may be used for different types of vehicles, including vehicles having internal combustion engines, including medium duty vehicles and heavy duty vehicles. The battery pack 102 may be part of a rechargeable battery system for the electric vehicle 106. The battery pack 102 may be coupled to an electric motor 104 that drives the vehicle and may provide a particular voltage/current to the electric vehicle. In one example, the electric vehicle 106 may comprise a fully electric vehicle driven entirely from stored electric power. In another example, the electric vehicle 106 may operate in a hybrid manner using both fuel combustion and stored electric power to operate the vehicle. In yet another example, the electric vehicle 106 may operate in various modes, e.g., a mode in which the vehicle relies on the battery pack for vehicle propulsion without a combustion engine, a hybrid mode in which the battery pack is used in combination with a combustion engine to drive the vehicle, and/or a combustion mode.

As described herein, battery packs and battery modules may be assembled in order to provide different voltages for different applications, e.g., for various vehicle types or for different battery storage applications. Aspects presented herein may be applied to batteries having varying sizes, voltages, and capacities.

Figure 2C:
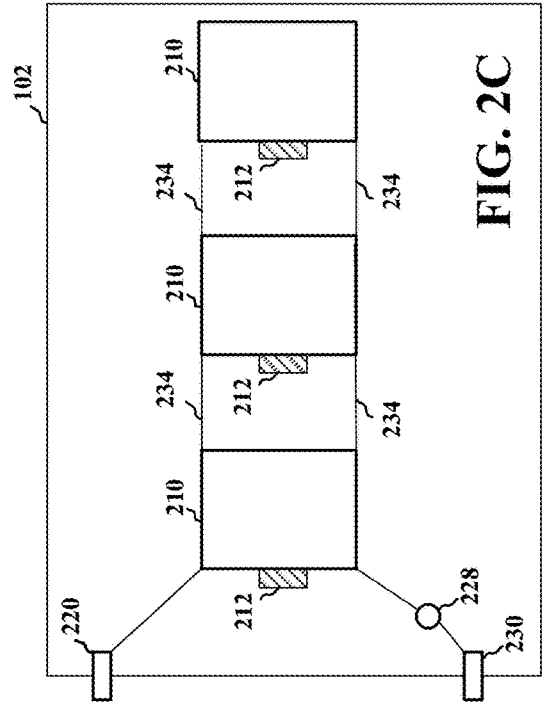
Figure 2A:
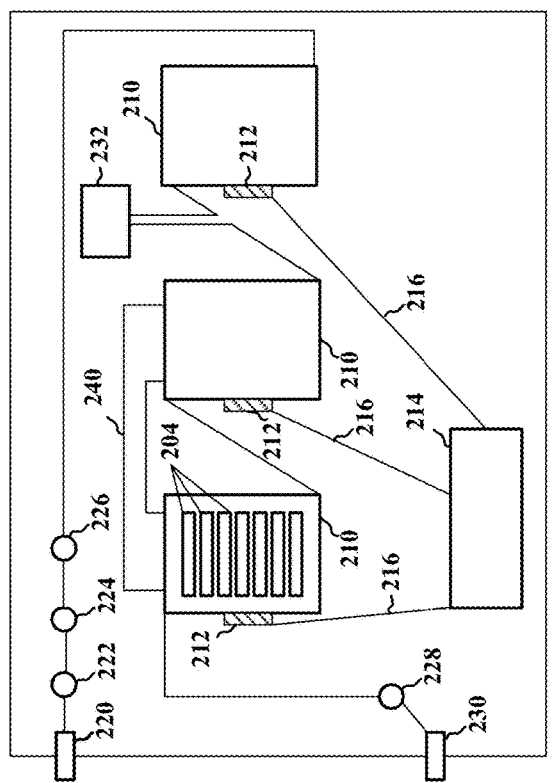

FIG. 2A illustrates an example diagram of battery pack 102. The battery pack 102 may comprise multiple battery modules 210, each battery module 210 (also referred to interchangeably herein as a "module") comprising a plurality of modular battery clips 204, as described in connection with FIGS. 3-15. Although three battery modules 210 are illustrated in FIG. 2A, any number of battery modules may be included in the battery pack, e.g., according to the desired voltage, desired capacity, etc. of the battery pack. Similarly, while FIG. 2A illustrate an example battery module comprising seven battery clips 204, each battery module may include any number of battery clips, e.g., according to the desired voltage, desired capacity, etc. of the battery module. Although modular battery clips 204 are illustrated in each of the battery modules in the battery pack in FIG. 2A, any number of modular battery clips may be included in each of the battery modules in the battery pack. Each battery module may comprise a Battery Management System (BMS). Each battery module 210 may comprise a slave BMS board (also referred to interchangeably herein as a "controller board", or "slave controller board"), that may be coupled to a master BMS board 214 for the battery pack 102. The slave BMS board 212 of each battery module 210 may be directly connected to the master BMS board 214, as illustrated by connections 216.

The battery pack may include electrical connections, e.g., a positive and negative connection. FIG. 2A illustrates connectors 220 and 230 for the battery pack 102, e.g., for coupling the battery pack with the electric motor 104 of a vehicle 106, an electrical system of a building 108, and/or power generation system 110. The battery pack may comprise a fuse 222, a current sensor 224, and a contactor 226 coupled via an input bus bar that connects to a first module 210. The order of components 222, 224, 226 may be changed, and additional sensors, such as temperature sensors, may be included in the battery pack. The battery modules 210 may be connected to each other, e.g., in series as illustrated in FIG. 2A or in parallel, as illustrated in FIG. 2B, depending on the desired voltage for the application. Thus, the number of battery modules and the manner in which the modules are connected to each other may vary depending on a desired voltage/capacity for the battery pack. A last battery module 210 may be coupled to contactor 228 and electrical connection 230, e.g., via an output bus bar.

The battery pack may also include a disconnect component 232 positioned between each of the modules 210. For example, a mid-pack disconnect may be provided to selectively break the connection between battery modules 210. Among others, the disconnect component 232 may comprise a switch or a physical component that is removed from the battery pack in order to prevent a complete circuit. The disconnect component 232 provides a safety feature so that the battery pack 102 can be safely serviced. The battery pack may also comprise ducting components, e.g., duct 240, to provide air flow for each of the battery modules 210 in order to provide temperature control for the battery pack. The battery pack may also include a casing in which the components of the battery pack are positioned.

FIG. 2C illustrates example alternate connections between battery modules 210. In FIG. 2A, the modules are connected to each other in series. In the example in FIG. 2A, the voltage of the battery pack 102 will be equal to the sum of the voltage of the individual modules 210. In FIG. 2C, the modules 210 are connected in parallel via connections 234. The voltage of the battery pack 102 in FIG. 2C will be the voltage of a single module, because the modules are connected in parallel. However, the battery pack in FIG. 2C will have an increased capacity due to each of the modules 210. FIG. 2B also illustrates an alternate connection between the master BMS board 214 and the slave BMS boards 212. In FIG. 2A, the master BMS board 214 has a point-to-point connection with each individual slave BMS board 212. In FIG. 2B, a daisy chained connection may be used to couple the master BMS board to at least a subset of the slave BMS boards 212. As illustrated, the master BMS board 214 may have a direct connection to only a single (or a reduced number of) slave BMS boards 212, which may in turn have a connection 218 to at least one other slave BMS board 212.

Figure 3:
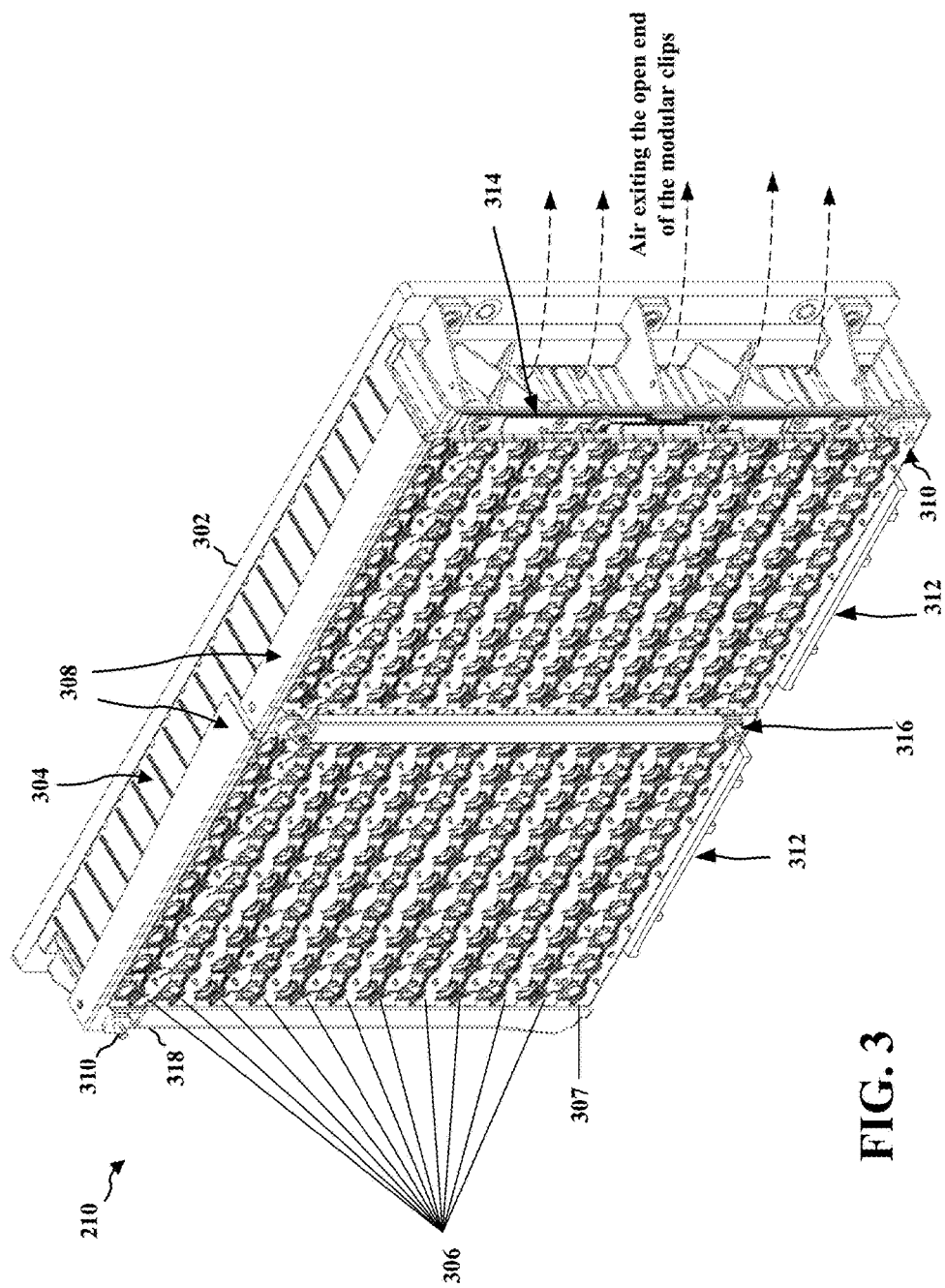
FIG. 3 illustrates an example battery module, in accordance with aspects presented herein.

FIG. 3 illustrates an example of a single battery module 210. The battery pack 102 in FIGS. 1 and 2 may include multiple such battery modules 210, as illustrated in FIG. 2. The battery module 210 comprises a base plate 302 and a plurality of modular clips 304, each modular clip configured to hold a plurality of battery cells. A side wall of a single modular clip 304 at an edge/side of the battery module 210 is visible in FIG. 3.

The base plate 302 may comprise a plastic, e.g., a polycarbonate or other plastic. The base plate may be injection molded using the plastic. However, the base plate may also be made with other materials and/or other methods. For example, the base plate may comprise a metal such as aluminum or steel. The base plate may be machined or die cast rather than injection molded. The modular clip 304 may comprise a plastic, e.g., a polycarbonate or other plastic. The modular clip may be manufactured using injection molding. Depending on the application, the plastic for the base plate and/or modular clips may be selected to include an acceptable flame resistant rating. The plastic may further be selected based on the expected temperature range for a particular application.

A plurality of interconnect plates 306 are included on a top of the battery module opposite the base plate 302. The interconnect plates 306 may comprise a conductive material, such as copper. The interconnect plates 306 may comprise an strip shaped interconnect plate. For example, the interconnect plates 306 may be positioned to overlap two adjacent modular clips, as shown in FIG. 3. However, the interconnect plates 306 may not overlap two adjacent modular clips. For another example, the design of the interconnect plates may be changed such that each of interconnect plates 306 is positioned on a top of only one modular clip.

A side interconnect plate (307 or 308), which is the interconnect plate positioned on a modular clip at a side of the battery module 210, may have a different shape than the interconnect plate 306 positioned on a modular clip in a middle of the battery module 210. For example, the side interconnect plates 307, 308 may have an L-shape cross-section as shown in FIG. 3. However, The side interconnect plates 307, 308 may have various shapes. The side interconnect plates 307, 308 may be flat and have a same shape as the other interconnect plates, if the maximum current of the battery module 210 is low. The side interconnect plates 307, 308 may be much thicker than the other interconnect plates, thus increasing the cross section and accomplishing the same performance as the L-shape cross section.

If portions of the base and/or clip are manufactured with a metal, it may be problematic for the base/clip to come into contact with interconnect plates 306. Thus, a nonconductive coating may be applied to any metal portions of the base or clip. Each interconnect plate 306 may partially overlap two, adjacent modular clips 304. The interconnect plates 306 may be shaped to enable connections with battery cells on each side of the interconnect plates 306. A connection, such as a wire bond may be established between the interconnect plates and each of the plurality of cells on the two sides of the interconnect plates. The interconnect plates 307 or 308, disposed at a side of the module 210, may overlap only a single modular clip. The side interconnect plates 307 or 308 may receive connections from cells in only a single modular clip, in contrast to inner interconnect plates 306. Connectors 310 may provide a connection point for connecting or otherwise coupling the module 210 to other modules, e.g., in series or in parallel, and to the other components of the battery pack 102, as illustrated in FIGS. 2A and 2B.

The module 210 may include at least one controller board 312 (e.g., corresponding to slave controller board 212 in FIG. 2). FIG. 2 illustrates an example in which the module may have a single slave controller board 212. FIG. 3 illustrates an example in which the module may comprise two slave controller boards 312. The number of slave controller boards may be based on the capabilities of a particular slave board, e.g., the number of rows of cells in series that the slave controller can monitor and control. The number of slave controller boards may also be based on a number of cells connected in series. The slave controller board 312 may be configured to control/monitor a voltage of each bank of battery cells and to balance the voltage. The slave controller board may also be configured to read other sensor readings such as temperature readings at temperature sensors positioned at a subset of battery cells. A master controller board 214 may control the slave controller boards and control discharging/charging of battery modules 210.

In addition to the slave controller board 312, the module 210 may further comprise at least one Printed Circuit Board (PCB) 314, e.g., a voltage sensing PCB. The voltage sensing PCB 314 may be connected to each interconnect plate in order to measure voltages between groups of cells. As shown in FIG. 3, the controller board 312 may be coupled to the plurality of interconnect plates 306 via the voltage sensing PCB 314. The voltage sensing PCB 314 replaces direct connection between the controller board 312 and the plurality of interconnect plates 306. The voltage sensing PCB 314 simplifies manufacturing process. However, the controller board 312 may be coupled to the interconnect plates 306 directly, eliminating the voltage sensing PCB.

FIG. 3 illustrates an example module 210 having 12 rows of modular clips, where each modular clip is able to receive 21 battery cells. In FIG. 3, the module has been configured as two electrical modules on different sides of the bus bar 316. On each half of the module, the 12 rows of modular clips each receive 10 battery cells. Thus, the two electrical groupings of the module 210 form a 12s10p array (12 is the number in series, 10 is the number in parallel), with the overall module providing a 24s10p grouping (24 is the number in series, 10 is the number in parallel).

Figure 4:
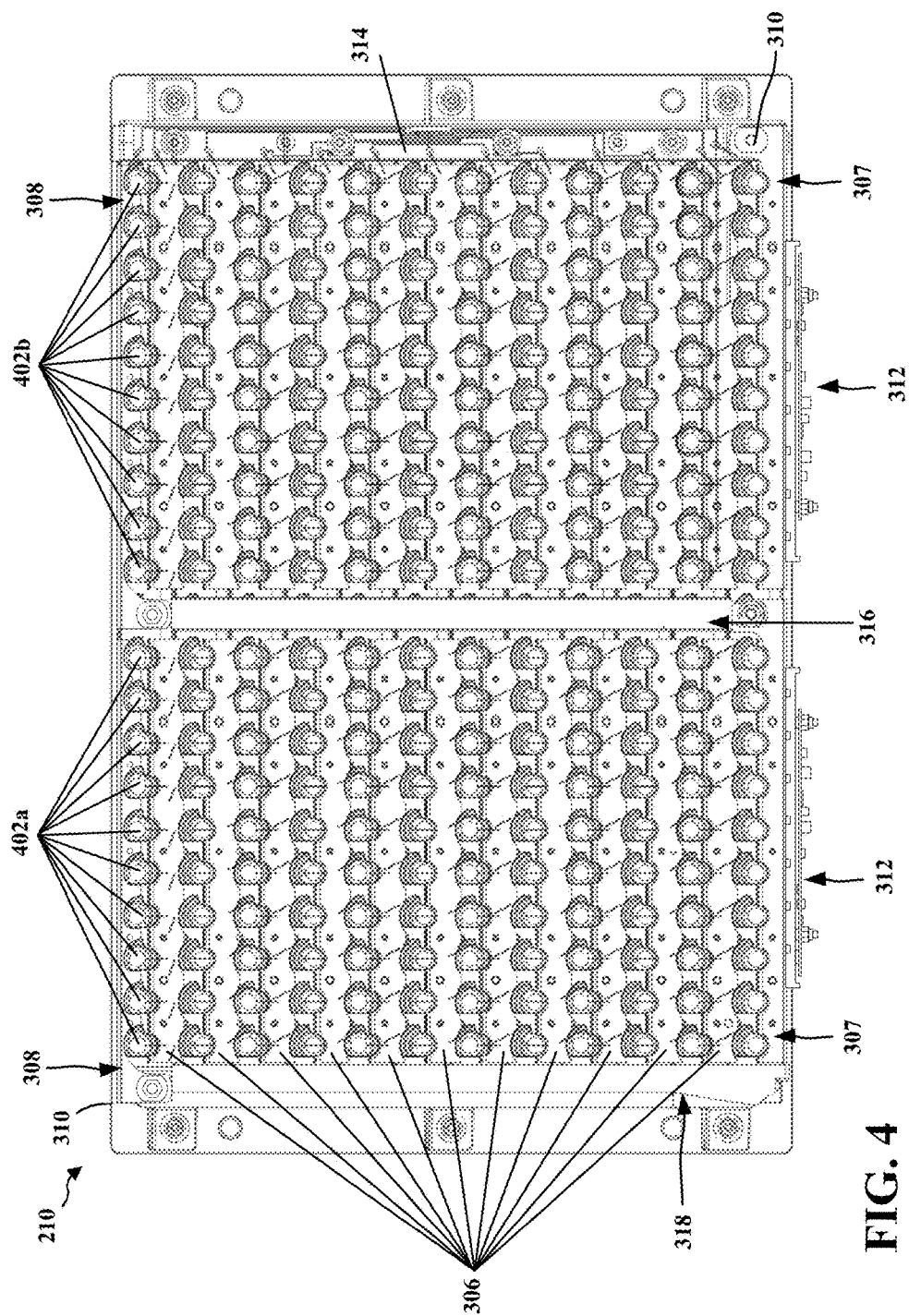
FIG. 4 illustrates a top view of an example battery module, in accordance with aspects presented herein.

FIG. 4 illustrates a top view of the battery module 210. As illustrated in FIG. 4, ten battery cells 402a, 402b may be positioned in a modular clip on each side of the bus bar 316. A single modular clip may receive and hold each of battery cells 402a and 402b. However, the cells in the single modular clip may be grouped into the two electrical groups based on the use of separate interconnect plates 306 and side interconnect plates 307, 308 on different sides of the bus bar 316.

In another example, the module may be configured without a bus bar, and the interconnect plates 306 and side connect plats 307, 308 may extend across a full length of the module rather than half of the length, as illustrated in FIGS. 3 and 4. Such a configuration would lead to groupings of 21 battery cells connected in parallel, and 12 rows connected in series, e.g., a 12s21p grouping (12 is the number in series, 21 is the number in parallel). The cells connected in parallel will be charged/discharged together. This configuration would provide half of the voltage of the two electrical modules of FIGS. 3 and 4, and would provide double the capacity.

The number of rows of modular clips and the number of battery cells that a particular modular clip is able to receive in FIG. 3 are merely non-limiting examples. Any number of rows of modular clips may be included in a battery module. For example, a module may comprise between 2-50 modular clips, e.g. between 2-24 modular clips. The design can also be extended beyond 50 modular clips per battery module. The number of modular clips in each module may be determined based on any of a number of factors, e.g., any combination of size limitations, weight limitations, assembly needs, voltage requirements, capacity requirements, etc. For example, a battery pack for energy storage does not have the same size and weight limitations as an electric vehicle and may comprise a higher number of modular clips in a single battery module. Similarly, the number of cells that a modular clip is configured to receive may vary. A modular clip may be configured to receive 2 or more battery cells. A range based on typical size and weight restrictions may comprise between 2-50 battery cells. However, the configuration itself does not place a limit on the number of battery cells or the number of modular clips combined in a single battery module 210. Similar to the basis for the number of modular clips 304 in a module 210, the number of cells 402 within a modular clip 304 may be selected based on any of a number of factors, e.g., any combination of size limitations, weight limitations, assembly needs, voltage requirements, capacity requirements, etc.

FIGS. 3 and 4 illustrate an example in which the module 210 may be configured to include multiple electrical modules, the different electrical modules sharing the same set of modular clips yet being separated by bus bar 316. In this example, the bus bar is positioned across the modular clips at a central position. While the clips physically form unitary rows, the electrical connections formed by the set of interconnects 402a, 402b may form two electrically separate modules. For example, the interconnect plates 306 and side interconnect plates 307, 308 extend only to the bus bar 316. Then, a separate set of interconnect plates 306 are provided on the other side of the bus bar 316.

The configuration of the module 210 as two separate electrical module enables the module 210 to achieve a voltage double that of a single electrical module, because the configuration doubles the number of groups of battery cells 402 that are coupled in series. Each electrical module may comprise a connection to a separate PCB 314.

If a higher voltage is desired, additional bus bars beyond bus bar 316 may be provided to further group the cells into electrically separate modules. Thus, a single bus bar 316 at a center cell position of the modular clips, as illustrated in FIGS. 3 and 4, is merely one example of the use of a bus bar to separate the module 210 into electrically separate modules.

The side of the module 210 opposite an inlet duct, e.g., duct 318, may include an additional outlet duct, e.g., for the purposes of collecting and directing the outlet air. For example, the outlet air could also be circulated through additional modules, as illustrated in duct 240 in FIG. 2A.

Figure 5:
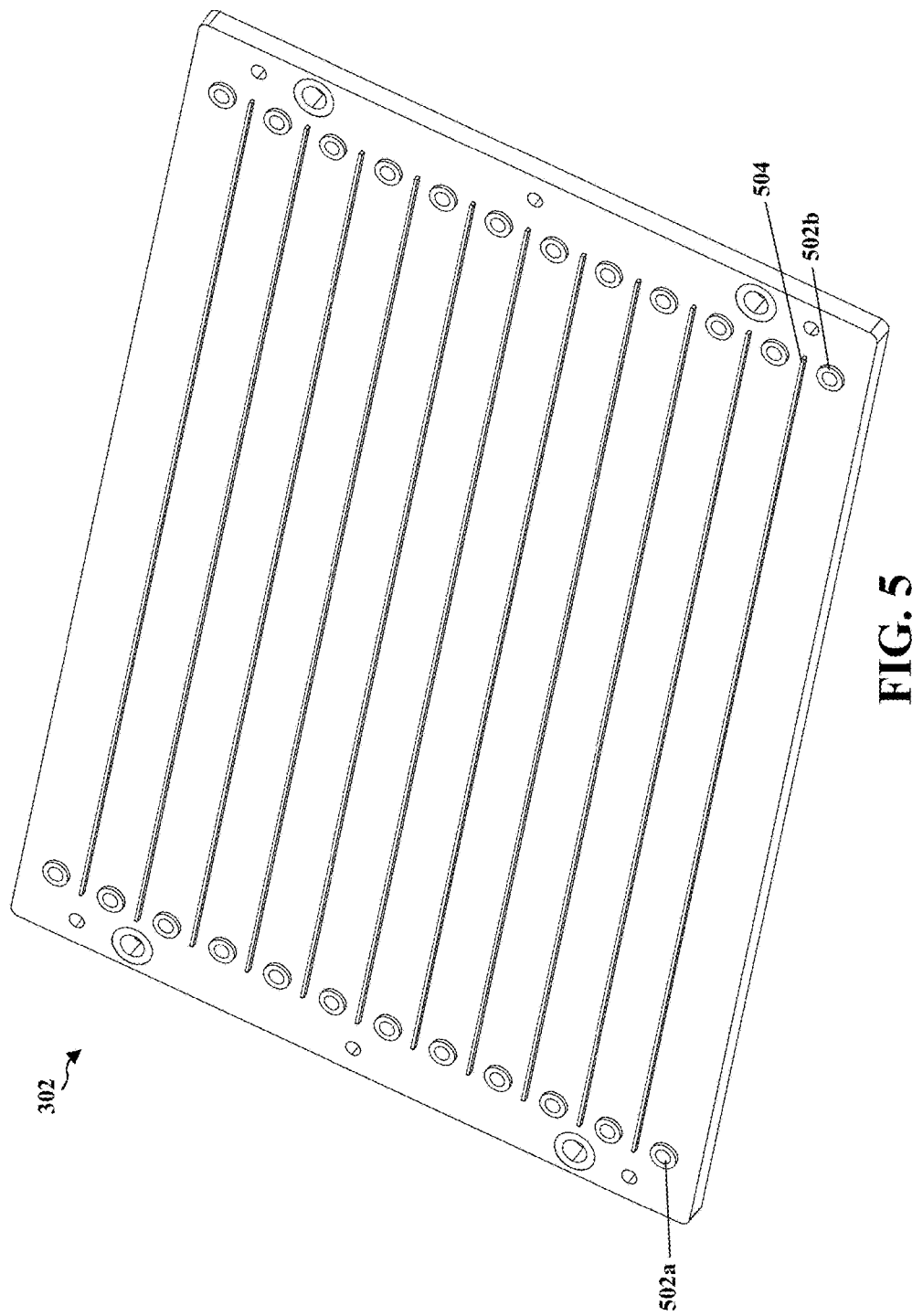
FIG. 5 illustrates a base plate of an example battery module, in accordance with aspects presented herein.

FIG. 5 illustrates an example base plate 302 to which multiple modular clips 304 may be mounted to form a battery module 210. The base plate may include openings to receive at least one fastener to hold each of the module clips to the base plate. For example, opening 502a may receive a fastener at one side of a modular clip 304, and opening 502b may receive a fastener at the opposite side of the modular clip 304. The base plate 302 may also include a positioning feature that assists in positioning the modular clips on the base plate. For example, the base plate may comprise at least one raised portion, e.g., a button, for positioning the modular clips. The modular clip 304 may comprise a corresponding indent shaped to match the raised portion. The raised portion and matching indent assist the modular clips 304 in being positioned on the base plate 302 with the correct spacing. FIG. 5 illustrates an example in which the raised portions may surround the openings 502a, 502b that receive the fastener to couple the modular clips 304 to the base plate 302. The base plate may also comprise a raised portion 504 that runs parallel to the direction in which the modular clips 304 will extend when fastened to the base plate.

Figure 6:
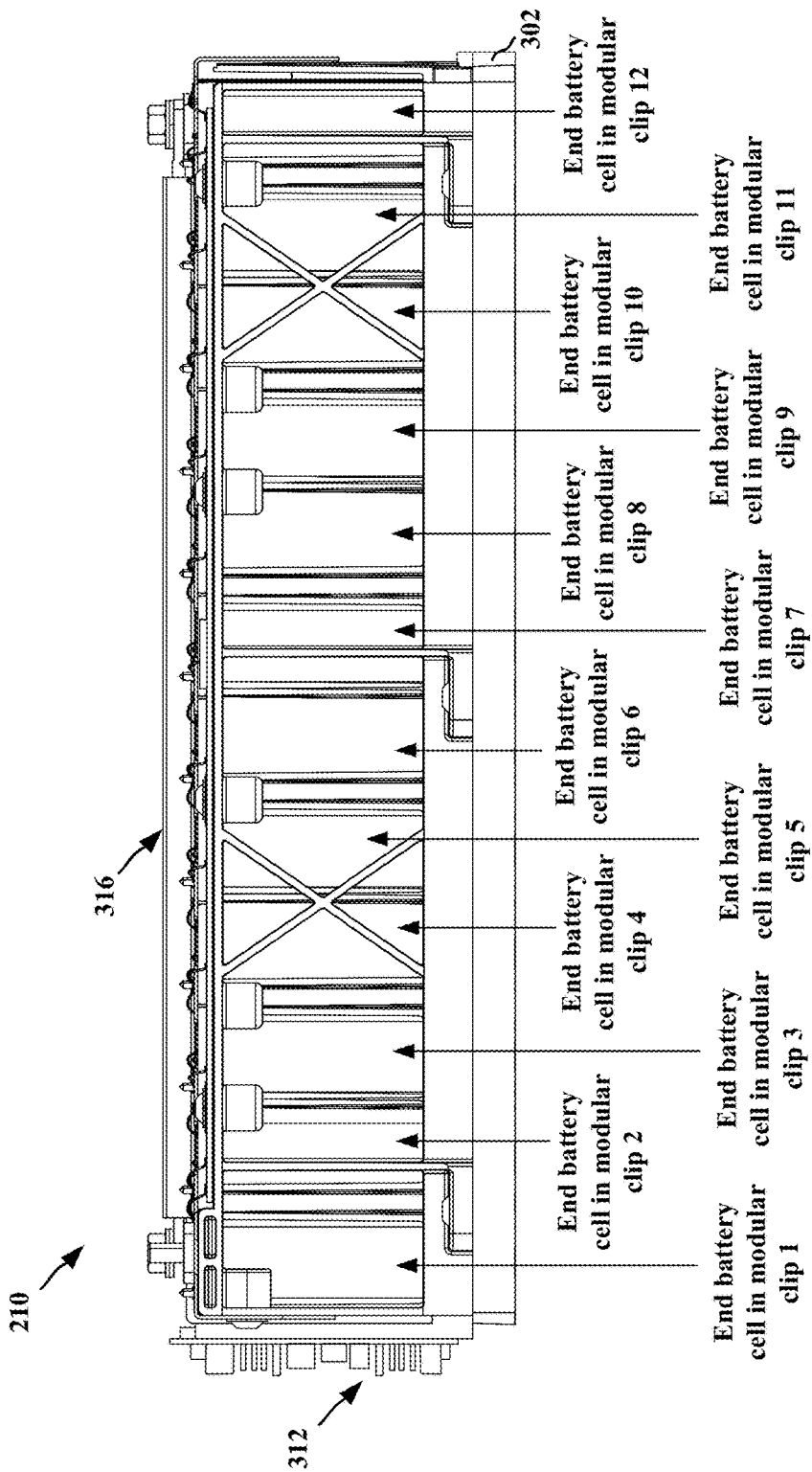
FIG. 6 illustrates a side view of an example battery module, in accordance with aspects presented herein.

FIG. 6 illustrates a side of battery module 210. For example, this open side of the battery module 210 may be the side through which the air exits cooling paths formed by the modular clips in some embodiments. FIG. 3 illustrates dashed lines showing the path through which air will exit the module 210. The side of the module 210 visible in FIG. 6 may be substantially open to allow air flow to freely exit from the path or channel formed by each modular clip. A single battery cell 402 in each of the 12 rows of modular clips is visible in FIG. 6.

Figure 7:
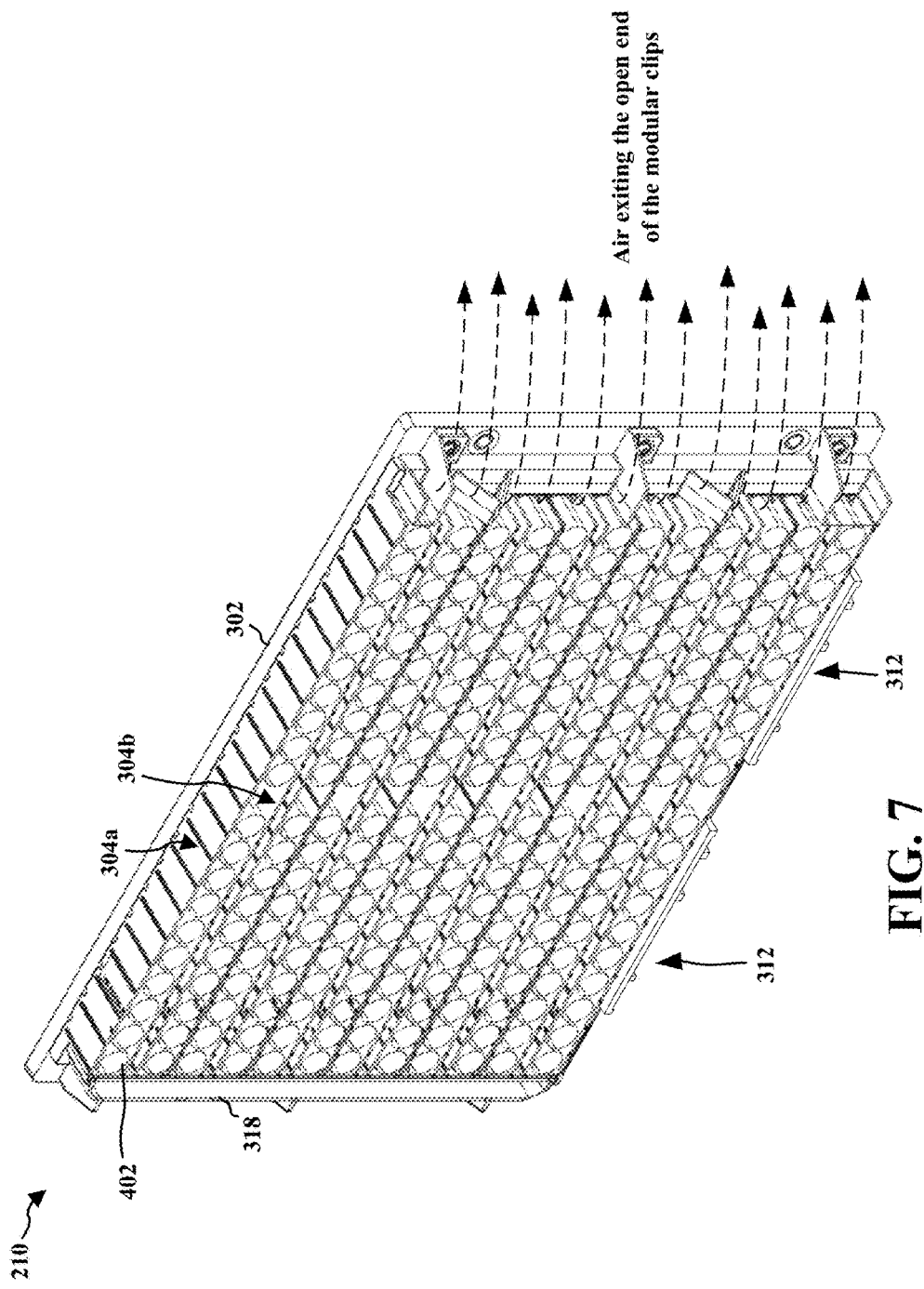
FIG. 7 illustrates a view of an example battery module having interconnect plates and retainer plates removed, in accordance with aspects presented herein.

FIG. 7 illustrates a cross section view of the module 210 along a plane parallel to the base plate 302, in which the interconnects and retainer plate 806 have been removed so that the linear rows of battery cells 402 in each modular clip 304 are visible. Each of the modular clips comprises two walls 304a and 304b that extend from a base portion of the modular clip. The battery cells 402 are received into the modular clip and positioned between the two walls 304a, 304b, e.g., in at least one linear row. In FIG. 7, the central cell position in each modular clip is empty and does not include a battery cell. The bus bar 316 may be positioned at this central location, for example.

Figure 8D:
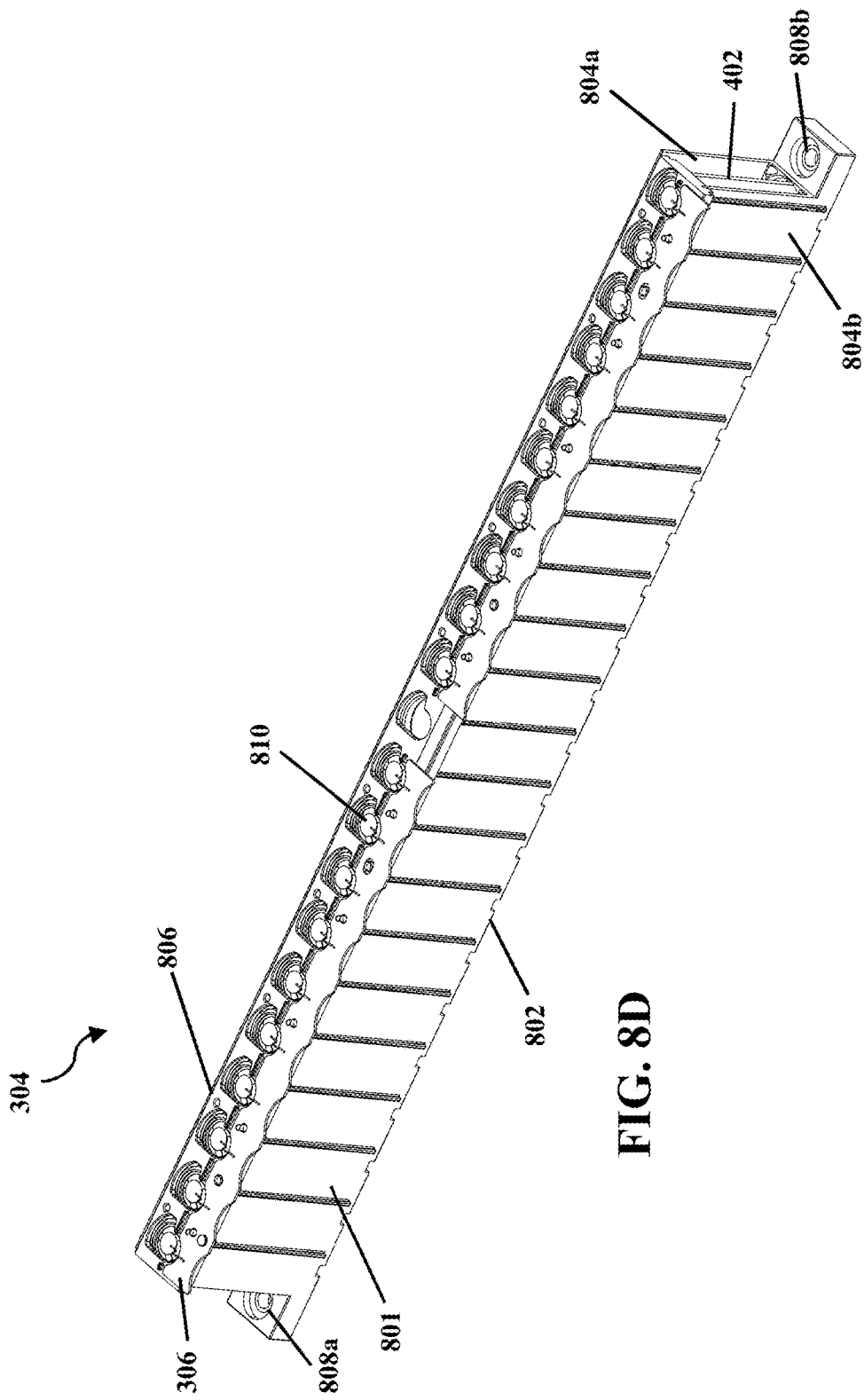
FIG. 8D illustrates a perspective view of the modular clip in FIG. 8A, in accordance with aspects presented herein.

FIGS. 8A-8H illustrate an example of a modular clip 304 for assembly in a battery module 210. FIG. 8A illustrates a side view of the modular clip 304. The modular clip 304 includes a housing configured to receive a plurality of battery cells 402. FIG. 8B illustrates a cross section of the modular clip 304 prior to insertion of battery cells 402, and FIG. 8C illustrates a cross section of the modular clip 304 having battery cells 402 inserted into the housing. FIG. 8C illustrates a position 814 at which no battery cell has been inserted. This may be the position of the bus bar 316, for example.

Referring to FIGS. 8A-8C, the housing of the modular clip 304 may include a clip shell 801. The clip shell 801 may include a base portion 802. The base portion 802 may comprise a plurality of bottom cell recesses 812 configured to surround a bottom portion of each of the battery cells 402. The plurality of bottom cell recesses 812 may be aligned along a first linear direction. FIGS. 8B and 8C illustrate the bottom cell recess 812 formed as an indent in the base portion 802 and having a shape corresponding to a bottom exterior of the battery cell 402. In FIGS. 8B and 8C, the bottom cell recess 812 comprises a circular/cylindrical indent. However, for battery cells of different shapes, e.g., prismatic, hexagonal, triangular, square, etc., the indent 812 may be similarly formed with a corresponding shape to receive the battery cell, as illustrated in FIG. 9A. Each of the plurality of bottom cell recesses 812 is configured to receive a battery cell 402.

Figure 8G:
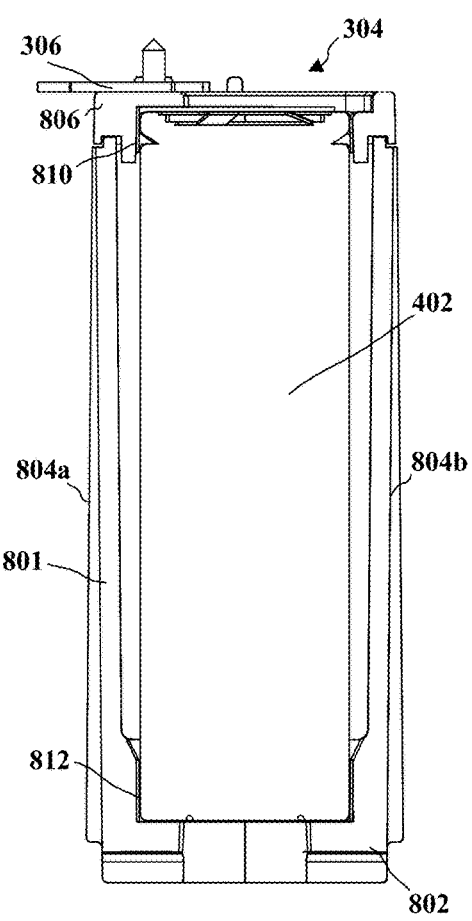
FIG. 8G illustrates a cross-section view of the modular clip in FIG. 8A, in accordance with aspects presented herein.
Figure 8H:
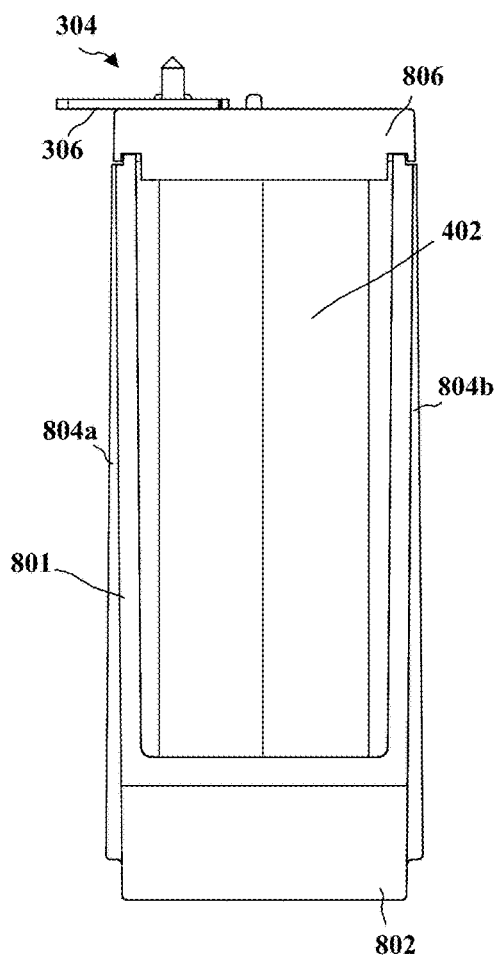
FIG. 8H illustrates an end view of the modular clip in FIG. 8A, in accordance with aspects presented herein.

FIG. 8D illustrates a perspective view of the modular clip 304, FIG. 8E illustrates a top view of the modular clip 304, FIG. 8F illustrates a bottom view of the modular clip 304, FIG. 8G illustrates a cross section view of the modular clip 304, and FIG. 8H illustrates an end view of the modular clip 304. As shown in FIGS. 8D-8H, the clip shell 801 of the modular clip 304 also includes a first wall 804a and the second wall 804b extending from the base portion 802 and spaced from the first wall 804a. The first wall 804a and the second wall 804b may have an elongated shape. The length of first wall 804a and the second wall 804b may be between 2 inches to 50 inches. For example, the length of first wall 804a and the second wall 804b may be between 20 inches to 25 inches. The plurality of battery cells 402 are received in the housing between the first wall 804a and the second wall 804b.

Referring to FIGS. 8A-8H, the modular clip 304 may also comprise a top portion 806, referred to interchangeably herein as a "retainer plate" or a "top cell retainer." The base portion 802 and walls 804a, 804b may be formed as a unitary piece, and the retainer plate 806 may be configured as a separate piece of the modular clip 304 that is attached after the battery cells 402 are inserted into the modular clip 304. In other examples, the base portion 802 and the walls 804a, 804b may comprise separate components that are coupled together along with the retainer plate to form the modular clip 304. The retainer plate 806 may comprise upper/top cell recesses 810, shaped to surround a portion of the top exterior of the battery cell 402. The plurality of top cell recesses 810 may be aligned with the plurality of bottom cell recesses 812 so that a battery cell can be received into a corresponding top recess 810 and bottom recess 812. Thus, a pair of a top cell recess 810 and bottom cell recess 812 may jointly surround portions of a battery cell at each end of the cell, e.g., a top and bottom of the battery cell. The cell retainers provide mechanical support to the cells in the event of a shock to the battery pack and controls the spacing between battery cells in the modular clip.

Thus, within a modular clip, the battery cells may be positioned at a set spacing from adjacent cells. Cell spacing may be selected to be passive propagation resistant (PPR) for the particular cell and wall spacing of the modular clip. The spacing may be determined empirically based on the configuration of the modular clip, the particular battery cells, the chemistry of the battery cells, the specification of the battery cells, the charge capacity of each battery cell, etc. The gap between battery cells within the row of a single modular clip may be greater than approximately 5 mm, 4 mm, 3 mm, 2 mm, or 1 mm, etc. In one example, the gap between battery cells within the row of a single modular clip may be greater than approximately 2 mm. The bottom recesses and top recesses may enable the battery cells to be slip fit into the modular clip. The bottom cell recess may have a depth in the range of approximately 2 mm to approximately 20 mm, or a depth of up to ⅓ the height of a battery cell. The retainer plate 806 may comprise an opening corresponding to each of the plurality of cells. The opening may be configured to enable a connection to be made to the upper portion of the cell and the interconnect plates 306, side interconnect plates 307, or 308.

FIGS. 8A-8H also illustrate extending portions 808a, 808b that may extend from each side of the modular clip 304. The extension portions 808a, 808b may comprise openings configured to align with the openings 502a, 502b in the base plate 302. A fastener may be inserted through the openings 808a, 808b, 502a, 502b and fastened in order to couple the modular clip 304 to the base plate 302. Openings 808a, 808b may each comprise a compression limiter 880a or 880b, that is configured to prevent the extending portion 808a, 808b from being crushed when the modular clip is fastened to the base plate 302. The compression limiter may comprise a different material than the modular clip. For example, the modular clip may comprise a plastic, and the limiter may comprise a metal. For example, the compression limiter may comprise a metal ring positioned inside the opening 808a, 808b. The fastener may comprise a threaded fastener, such as a screw. The modular clips may also be fastened to the base plate using other fastening mechanisms, e.g., including a tab attachment piece at the modular clip, an adhesive, a heat stake, etc.

FIGS. 8A-8H also illustrate the modular clip 304 comprising at least one interconnect plate 306 configured to connect at least a subset of the plurality of battery cells 402 to a controller board. The at least one interconnect plate 306 extends across a portion of the modular clips 304, the portion corresponding to a subset of the plurality of battery cells 402 positioned in a subset of the bottom cell recesses 812.

Various types of battery cells 402 may be used in connection with the aspects presented herein. The battery cell may comprise a lithium-ion battery cell. Other examples of the chemistry of the battery cell may comprise nickel-metal hydride, lead-acid, lithium iron-phosphate, lithium titanate, etc. While cylindrical battery cells are illustrated in FIG. 7, the battery cells may comprise a prismatic cell, cylindrical cells, or other geometries.

FIG. 9A illustrates a modular clip 910 having different examples of prismatic batteries, e.g., having a square cross-section 912, a rectangular cross-section 914, a triangular cross section 916, and a hexagonal cross-section 918. The cell retainers in the modular clips may be shaped according to the exterior shape of selected battery cell. Similarly, the aspects presented herein may be configured for use with battery cells of various sizes. One example of a cylindrical battery cell may be a 10 mm diameter and a 70 mm length. Other shapes/sizes of battery cells are equally applicable to use in the modular clip design presented herein. For example, another size battery cell may comprise a 18 mm diameter and 65.5 mm length, etc. The modular clip may be scaled to the size of any particular battery cell.

FIG. 9B illustrates an example modular clip 902 configuration having a single linear row of cells of any number. In FIGS. 3-8H, the modular clips are illustrated as having linear walls 804a, 804b to form straight rows of battery cells. The modular clips are also illustrated as only having a single row of battery cells. The plurality of bottom cell recesses 812 are aligned along a first linear direction. The plurality of modular clips 304 can be aligned along a second linear direction perpendicular to the first linear direction. Similarly, the plurality of bottom cell recesses may be aligned along a first linear direction in FIG. 9B. For example, at least one cell position 904 may be left unoccupied. This may be for a bus bar 316 position to create different electrical units for the cells within a modular clip 304/battery module 210 or for other uses.

It is advantageous to have modular clips with a plurality of bottom cell recesses 812 being aligned along a first linear direction. For example, modular clips with a linear row configuration may improve efficiency for mass production and assembly. However, the modular clips may also have other configurations.

In addition, a linear row configuration can be advantageous for the cooling of the battery module 210. Each modular clip 304 can further include a cooling path, e.g., a gap, channel, or opening, that extends along the length of the modular clip past each of the cell holders that receive battery cells. The cooling path may comprise a gap or channel between a wall of the clip and the battery cells. Thus, when battery cells 402 are inserted into the cell holders 812, the cooling path directs air to flow through the length of the clip 304, flowing past and around the battery cells 402. FIGS. 8G and 8H illustrate an example gap between walls 804a, 804b and the battery cell 402 that may form at least part of the cooling path.

FIG. 9C illustrates an example modular clip 906 being configured to receive two staggered rows of battery cells. As shown in FIG. 9C, a first subset of the plurality of bottom cell recesses may be aligned along a first linear direction, and a second subset of the plurality of bottom cell recesses may be aligned along a second linear direction parallel to the first linear direction. Thus, the second subset of bottom cell recesses may be positioned at a staggered position relative to the first subset of bottom cell recesses. The modular clips with two staggered rows of battery cells may have a higher battery density that a configuration with a single row. However, the staggered configuration may need a different cooling path gap spacing between the interior of the walls 804a, 804b and the exterior of the battery cells 402 than is needed for a single row of battery cells. The staggered configuration in FIG. 9C may similarly have a different cell spacing between adjacent battery cells 402 than a clip 304 configured to receive a single row of battery cells 402.

FIG. 9D illustrates an example modular clip 908 with curved walls, e.g., walls 804a, 804b. The plurality of bottom cell recesses in the modular clip 908 may be aligned along a curved direction. For example, the walls of the modular clip may have a curved, rounded, arced, or other customized shape. Thus, the modular clips, battery modules, and battery pack described herein may be shaped to fit to a customized position in a vehicle or other structure, for example, in order to effectively maximize the number and/or placement of battery modules.

Figures 10A, 10B:
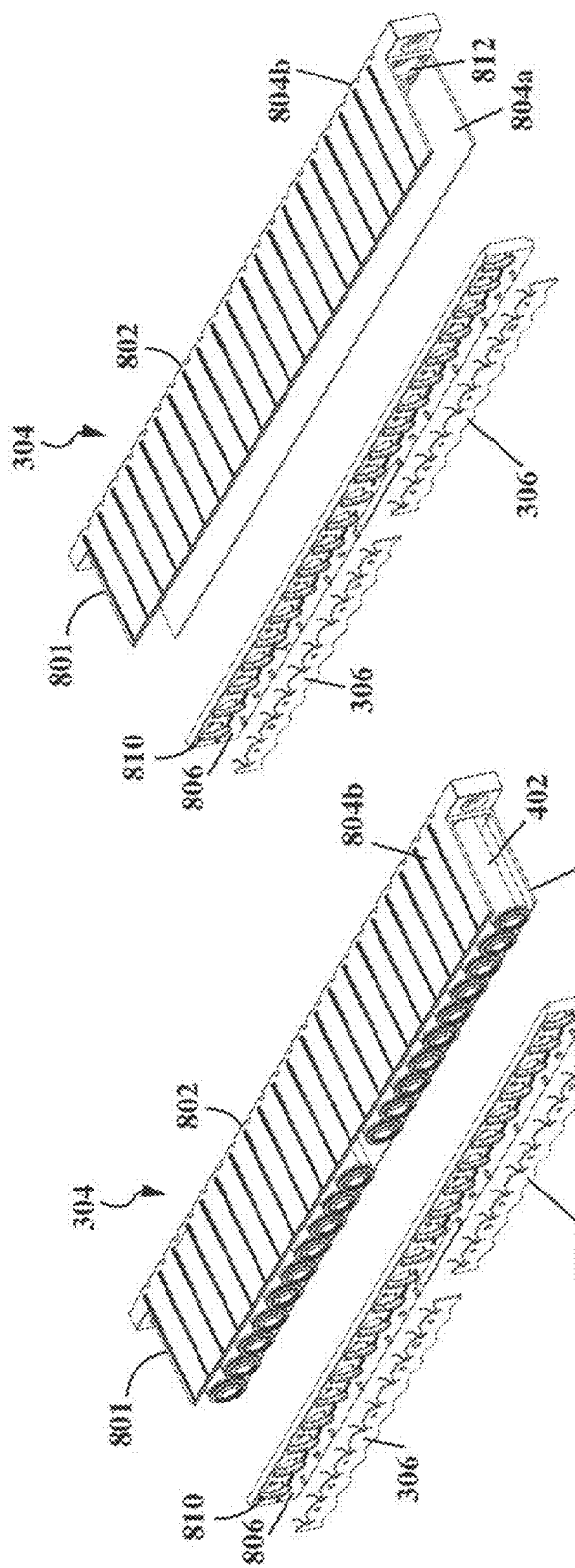
FIG. 10A illustrates an exploded view of the modular clip in FIG. 8A with battery cells, in accordance with aspects presented herein.
FIG. 10B illustrates an exploded view of the modular clip in FIG. 8A without battery cells, in accordance with aspects presented herein.
Figure 12C:
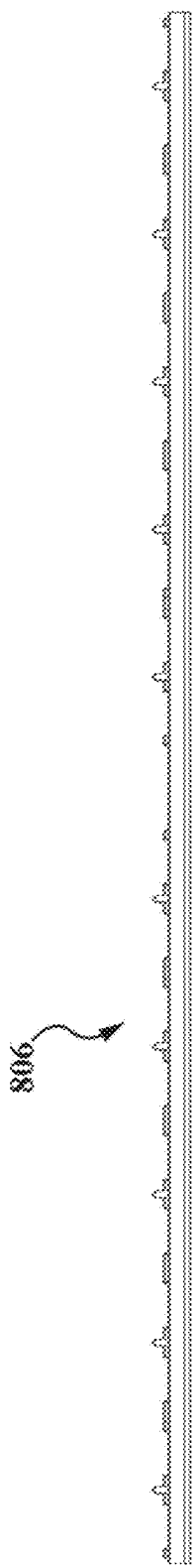
FIG. 12C illustrates a side view of the retainer plate in FIG. 11A, in accordance with aspects presented herein.
Figure 12D:
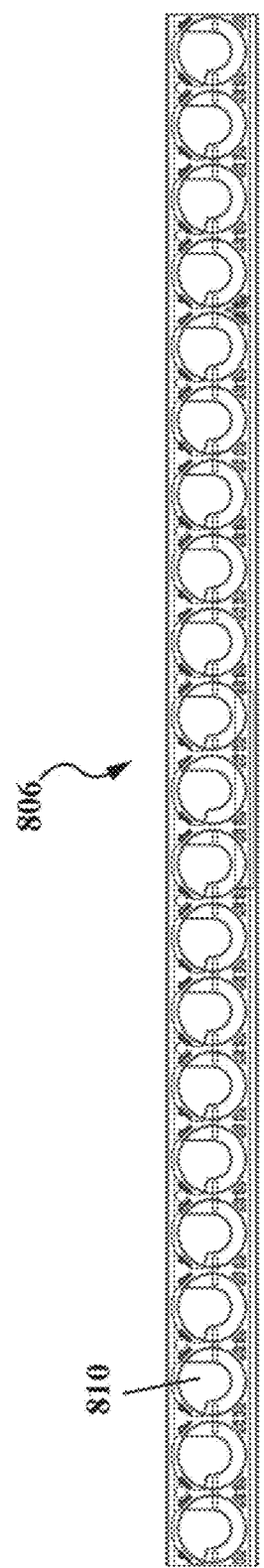
FIG. 12D illustrates a bottom view of the retainer plate in FIG. 11A, in accordance with aspects presented herein.

FIG. 10A illustrates an exploded view of the modular clip 304 with battery cells 402. FIG. 10B illustrates an exploded view of the modular clip 304 without cells. The modular clip 304 may be a submodule for a battery module. The modular clip 304 comprises a housing configured to receive a plurality of battery cells. The housing includes the clip shell 801. The clip shell 801 includes a base portion 802, a first side wall 804a, and a second side wall 804b. The base portion 802 includes a plurality of bottom cell recesses 812, each of the plurality of bottom cell recesses 812 is configured to receive a battery cell 402, e.g., in a slip fit manner. Each of the plurality of bottom cell recesses 812 comprises an indent shaped to surround an exterior of a battery cell 402. The first wall 804a extends from the base portion 802, and the second wall 804b extends from the base portion 802 and spaced from the first wall 804a. The plurality of bottom cell recesses 812 are aligned along a first linear direction, for example.

As shown in FIGS. 10A and 10B, the modular clip 304 can further include a retainer plate 806 at a top side of the modular clip. The retainer plate 806 may also be referred to as a "top/upper cell retainer." The retainer plate 806 can include a plurality of top cell recesses 810. The top cell recesses 810 are shaped to surround a portion of the top exterior of the battery cell 402. The plurality of top cell recesses 810 may be aligned with the plurality of bottom cell recesses 812. Thus, a pair of a top cell recess 810 and bottom cell recess 812 may jointly surround portions of a battery cell at each end of the cell, e.g., a top portion and a bottom portion of the battery cell.

FIGS. 11A-11C illustrate a perspective view, a side view and a top view of an example modular clip shell 801. The clip shell 801 can have an elongated shape and include the base portion 802, the first side wall 804a, and the second side wall 804b. Each of the plurality of bottom cell recesses 812 can have a circular indent shaped to surround an exterior of the battery cell 402. An opening may be provided in the indent, e.g., and shaped to surround a bottom vent of a battery cell. The bottom cell recess 812 may have a depth in the range of approximately 2 mm to approximately 20 mm, or a depth of up to ⅓ the height of a battery cell. The clip shell 801 can further includes extending portions 808a, 808b that may extend from each side of the clip shell. The extension portions 808a, 808b may comprise openings configured to align with the openings in the base plate of the battery module. Openings 808a, 808b may each comprise a compression limiter that is configured to prevent the extending portion 808a, 808b from being crushed when the clip shell 801 is fastened to the base plate. The modular clip 801 and base plate 302 may include at least one channel positioned between the base plate and modular clip to enable venting from a battery cell through the opening in the indent shaped bottom recess to an exterior of the battery module.

FIGS. 12A-12D illustrate a perspective view, a top view, a side view and a bottom view of an example retainer plate 806. The retainer plate 806 is configured to connect to the clip shell 801 to secure the plurality of battery cells 402, and further configured to connect to the interconnect plates 306 or side connect plates 307, 308, which provide electrical powers to the battery cells 402. The retainer plate 806 can include a plurality of top cell recesses 810. The plurality of top cell recesses 810 are aligned with the plurality of bottom cell recesses 812. Thus, when the plurality of bottom cell recesses are aligned along a first linear direction, the plurality of top cell recesses 810 are also aligned along the first linear direction. When the plurality of bottom cell recesses are aligned along a curved direction, the plurality of top cell recesses 810 are also aligned along the curved direction.

As shown in FIGS. 12A-12D, each of the plurality of top cell recesses 810 may comprise an opening 860 extending through the retainer plate 806. The opening 860 may have a circular shape at a bottom side of the cell recess, which is closer to the battery cells, for example. The circular shape may be shaped to the exterior of the battery cell, e.g., to receive the battery cell in a slip fit manner. From the bottom view in FIG. 12D, each of the plurality of top cell recesses 810 comprises an indent shaped to surround a top portion of an exterior of the battery cell. The shape of the indent at the bottom side of the retainer plate 306 corresponds to the shape of the indent of the bottom cell recesses in the base portion of the clip shell. The opening 860 in the retainer plate 806 may have a different shape at a top side (or exterior side) than the shape at the bottom side (or interior side in which the battery cell is held).

Referring to FIG. 12A and FIG. 12B, the retainer plate 806 can further comprise a plurality of heat stakes 822 and a plurality of locating buttons 824, 825. The heat stake 822 is also visible in the view of FIGS. 8G and 8H. The plurality of heat stakes 822 and the plurality of locating buttons 824, 825 are configured to align and connect the retainer plate 806 to at least one of a plurality of interconnect plates 306, including side interconnect plates 307 and 308. The top cell recesses 810 at the retainer plate 806 may be shaped to surround a portion of an exterior of the battery cell 402 to provide mechanical support to the cells in the event of a shock to the battery pack. The top cell recesses 810 may receive and stabilize the battery cells. The retainer plate 806 may comprise an opening corresponding to each of the plurality of cells. The opening 860 may be configured to enable a connection to be made to electrical terminals at a top portion of the cell 402 and the interconnect plates 306, 307, 308. Thus, the opening 860 may comprise a different shape on the interior side receiving the battery cell and the exterior side configured to enable an electrical connection between the battery cell and the interconnect plates 306, 307, 308.

Figure 13B:
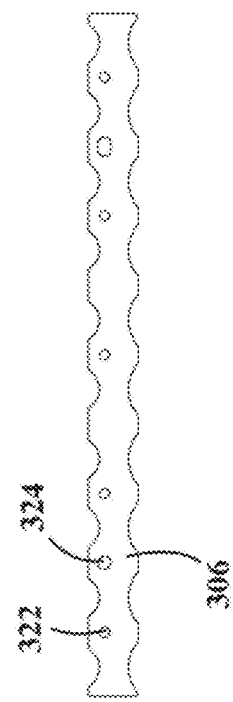
FIG. 13B illustrates a top view of the example interconnect plate in FIG. 13A, in accordance with aspects presented herein.
Figure 14B:
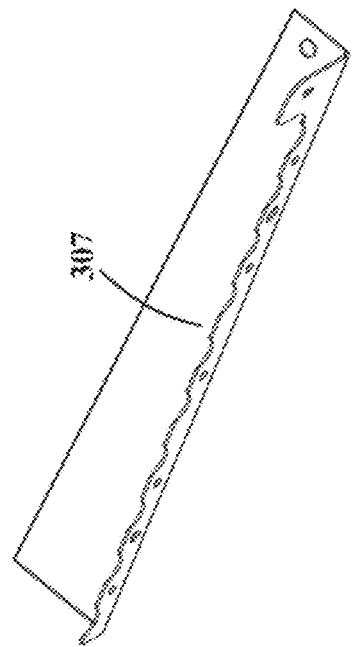
FIG. 14B illustrates a perspective view of another example interconnect plate positioned on a modular clip at a side of a battery module, in accordance with aspects presented herein.
Figure 13A:
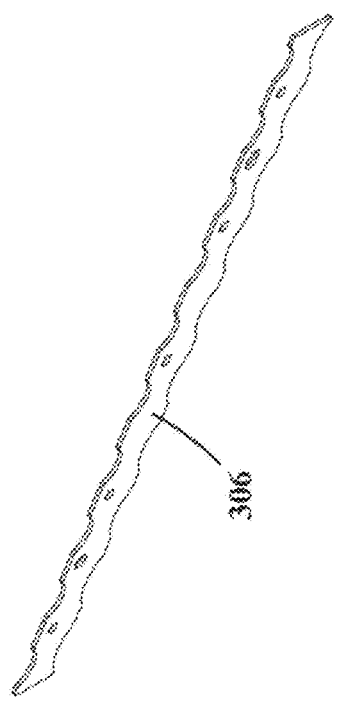
FIG. 13A illustrates a perspective view of an example interconnect plate, in accordance with aspects presented herein.
Figure 14A:
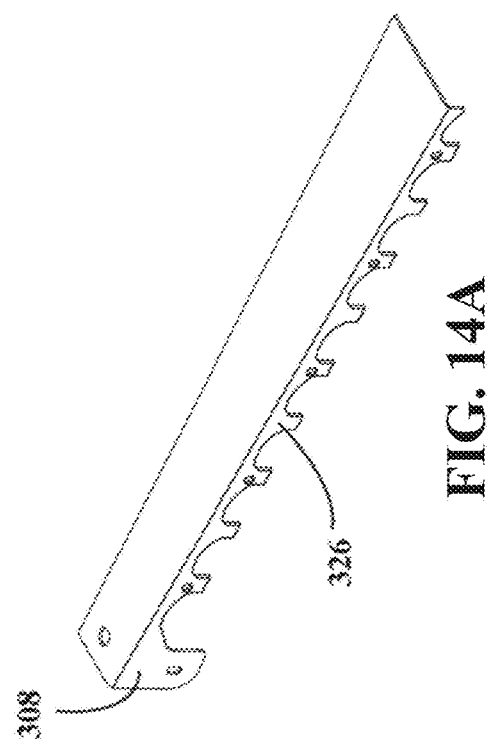
FIG. 14A illustrates a perspective view of an example interconnect plate positioned on a modular clip at a side of a battery module, in accordance with aspects presented herein.
Figure 16:
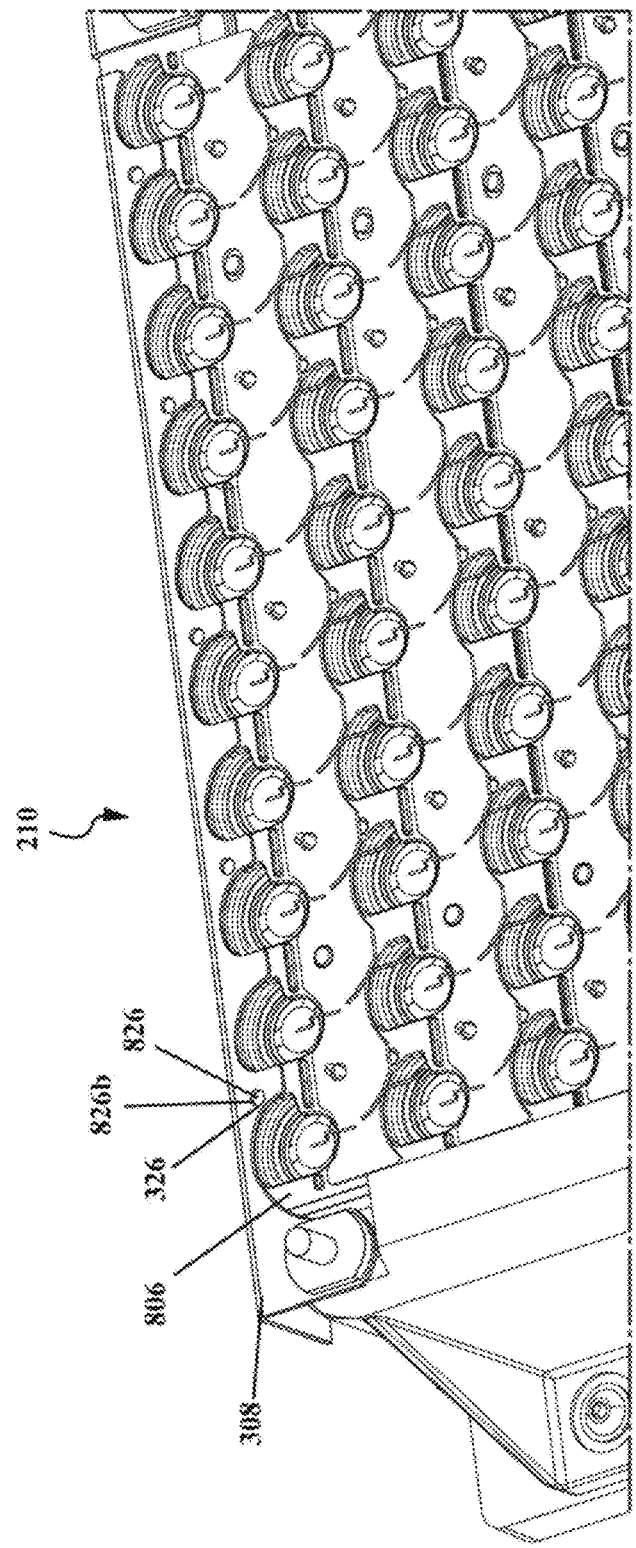
FIG. 16 illustrates a battery module having a plurality of ultra-sonic pins, in accordance with aspects presented herein.

FIG. 13A and FIG. 13B illustrate a perspective view and a top view of an example interconnect plate, in accordance with aspects presented herein. A plurality of interconnect plates 306 are included at a top of each modular clip of the battery module. As shown in FIGS. 13A and 13B, the interconnect plate 306 may comprise a strip shaped interconnect plate 306 positioned to overlap two adjacent modular clips. However, as shown in FIG. 14A and FIG. 14B, a side interconnect plate may have an L-shape cross-section. A connection, such as a wire bond may be established between the interconnect plates and each of the plurality of cells on the two sides of the interconnect plates. FIG. 16 illustrates wire bonds between interconnect plates and battery cells. The side interconnect plates in FIG. 14A and FIG. 14B may receive connections from battery cells 402 in only a single modular clip 304. The interconnect plates 306, 307 and 308 may comprise a plurality of holes 322, 324, and 325, corresponding to the plurality of heat stakes and locating buttons in the retainer plate, in order to align and connect to the retainer plate. In addition, the interconnect plates 306, 307 and 308 may also comprise a plurality of cut-outs 1402, shaped corresponding to at least a portion of the openings 860 in the retainer plate. The cut-outs may be shaped to enable electrical connections to be formed between the terminals of the battery cells 402 and the interconnection plates 306, 307, or 308 through the opening 806 in the retainer plate.

FIG. 15 illustrates the retainer plate 806 having the plurality of heat stakes 822 and locating buttons 824, 825. The retainer plate 806 is connected with the interconnect plate 306. Heat staking may involve the process of connecting two components by using heat to deform and lock two components together. The interconnect plate may be positioned having the heat stakes extending through openings in the interconnect plate. The heat stakes may assist in proper placement of the interconnect plates. Then, heat and pressure may be applied to the heat stake to melt the heat stake and cause it to form a fastener holding the interconnect plate in position against the retainer plate 806 of the modular clip. The use of heat stakes to fasten the interconnect plates to the may enable fast and consistent placement of the interconnect plates. The heat stakes may be used to join plastics to other materials (e.g. metal, PCB's) in addition to joining like or dissimilar plastics. The retainer plate 806 may comprise the plurality of heat stakes 822 and the plurality of locating buttons 824 and 825. The interconnect plates 306, 307 and 308 may comprise a plurality of holes 322, 324, and 325 corresponding to the locating/fastening features, e.g., heat stakes 822, locating buttons 824, 825, etc. The locating buttons 824 and 825 may be used to perform alignment of an interconnect plate 306 relative to a retainer plate 806. Some of the locating buttons may be 4-way locating buttons that restrict the position of an interconnect plate 306 in four directions, when the interconnect plate is placed on the retainer plate 806. Some of the locating buttons may be 2-way locating buttons that restrict the position of the interconnect plate 306 in two directions when the interconnect plate 306 is placed on the retainer plate 806. The size and shape of the openings in the interconnect plates 306, 307 and 308 may correspond to the shape and size of the 4-way locating buttons and 2-way locating buttons, e.g., to surround the locating buttons and assist with proper placement of the interconnect plate relative to the retainer plate. Once an interconnect plate 306 is properly placed, a heat staking process may be used to melt the heat stakes 822 and press them against the interconnect plate 306 so that the portion of the heat stake 822 above the interconnect plate spreads to a shape larger than opening 322. Thus, the heat staking can be used to form a permanent connection fastening the interconnect plate 306 to the retainer plate 806. The retainer plate may be connected with the interconnect plate in many other ways, not being limited to the heat staking process. As shown in FIG. 15, the retainer plate 806 may also include a plurality of barriers 850 on the upper surface of the retainer plate. For example, Each of the barriers 850 may protrude or extend upward from the surface of the retainer plate 806. For example, the barrier 850 might be positioned between an electrical terminal of the battery cell and the interconnect plate 306. The barrier 850 can provide a barrier to prevent an arc being formed between the electrical terminal on one side of the barrier and the interconnect plate on the other side of the barrier, and may have a height that extends higher than a wire bond between the battery cell and the interconnect plate, e.g., as illustrated in FIG. 16.

FIG. 16 illustrates a battery module 210 having a plurality of knurled pins 826b at a side modular clip 304 to hold in place a side interconnect plate 308. Referring to FIGS. 12A-16, the side interconnect plates 307, 308 positioned at the side of the battery module 210 may have a different configuration and may need to fasten to the modular clip in a different manner than the other interconnect plates 306. For example, the side interconnect plate 308 may be held in place by fasteners. For another example, the side interconnect plate 308 may be held in place by knurled pins, ultrasonically installed. Ultrasonically installed knurled pins 826b may be used to connect the side interconnect plate 308 to the retainer plate 806 in order to enable a single modular clip 304 to be used regardless of the placement of the modular clip within a battery modular 210.

As shown in FIG. 16, it might not be practical for a heat staking process to be used to fasten side retainer plate 308 to modular clip 304 at a side of the battery module 210. In order to fasten a side interconnect plate 308, a heat stake 822 would need to be provided on both sides of a modular clip. However, if a heat stake were provided at a modular clip 304 to fasten the side interconnect 308, the modular clip would not be compatible with the middle modular clips that are overlapped by two strip shaped interconnect plates 306, because the heat stake would block placement of at least one of the interconnect plates. In order to enable a single modular clip design to be configured for placement at any position, e.g., a middle position or a side position, on the base plate, a different fastening mechanism may need to be provided for the side interconnect 308. The retainer plates may be mass manufactured with the heat stakes disposed only at one side, in order for the interconnect plates to overlap two adjacent retainer plates of two adjacent modular clips. Thus, for the opposite side of the heat stakes, the retainer plates 806 may include a plurality of holes 826 for receiving a fastener to fasten an interconnect plate in a different manner. The corresponding side interconnect plates 308 may also include a plurality of holes 326, corresponding to the plurality of holes 826. Among other types of fasteners, in one example, the knurled fastener 826b can be ultrasonically inserted into both holes 326 and 826 and installed to connect the side interconnect plate 308 and the retainer plate 806 together. Thus, the retainer plate 806 may comprise at least two different type of fastening mechanisms (e.g., a heat stake and an opening configured to receive a fastener such as an ultrasonically installed knurled fastener) to fasten interconnect plates to the retainer plate. Both types of fastening mechanisms may be compatible with placement of the modular clip 304 at various positions within a battery module 304, e.g., at an end/side clip position or in a middle position between adjacent clips.

Figure 17:
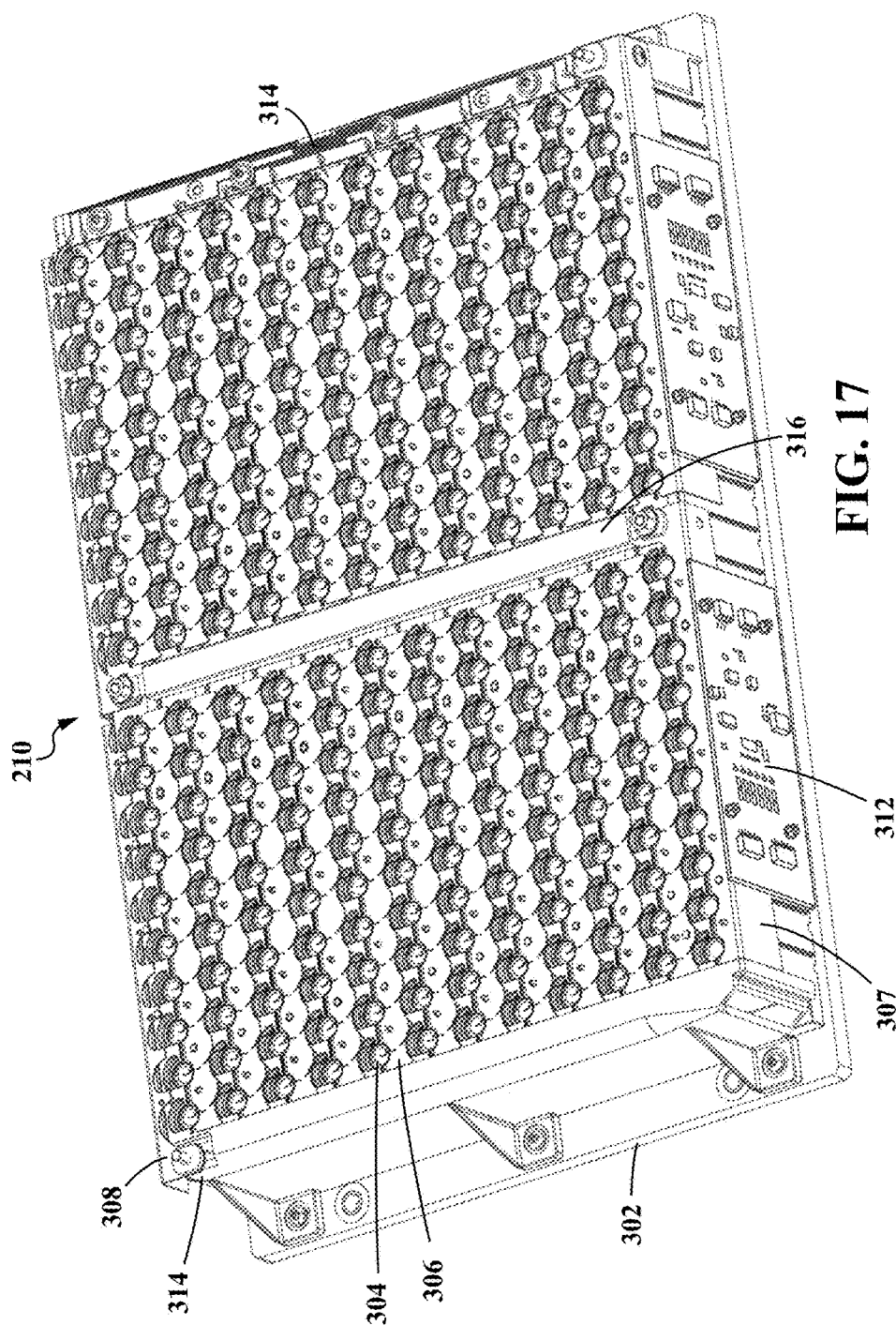
FIG. 17 illustrates a perspective view of an example battery module with interconnect plates, in accordance with aspects presented herein.

FIG. 17 illustrates a perspective view of an example battery module with interconnect plates 306, 307 and 308. As shown in FIG. 17, the battery module comprises a base plate 302, a plurality of modular clips 304 coupled to the base plate 302. Each of the plurality of modular clips 304 is configured to be a sub-module of the battery module 210. Each of the plurality of modular clips 304 includes at least one interconnect plate 306 configured to connect at least a subset of the plurality of battery cells 402 to at least one controller board 312. The battery module 210 can further include at least one controller board 312 coupled to the at least one interconnect plate 306 via at least one voltage sensing PCB 314. The battery module 210 may further include the at least one voltage sensing PCB 314. Each electrical module of the battery module 210 may include one voltage sensing PCB. For example, the battery module 210 having two electrical modules may include two voltage sensing PCBs 314 at both sides of the module (the voltage sensing PCB 314 at one side is under the cover, not shown in FIG. 15). In cases where there is more than one bus bar 316, resulting in more than two separate electrical modules within a single battery module, the battery module 210 may also have more than two voltage sense PCBs 314.

It is advantageous to have the battery packs having battery modules with modular clips disclosed herein. A first advantage is that each modular clip 304 is configured to be a sub-module of the battery module 210, and each modular clip can be mass produced by automatic assembly lines. Greater efficiency in the assembly and production of the battery packs can be facilitated, resulting in significant cost reduction. A second advantage is that modular clips 304 improve the ability to service and replace a worn, damaged, or defective battery. In the event of a battery cell failure, a single modular clip 304 can be replaced rather than replacing an entire battery module 210.

Furthermore, it is advantageous to have modular clips 304 with a linear row configuration, where a plurality of bottom cell recesses 312 are aligned along a first linear direction. For example, the linear row configuration of the modular clips 304 can form effective cooling paths between the first side walls and the second side walls. For another example, the linear row configuration of the modular clips can simplify manufacturing and assembly processes. Each modular clip 304 can be easily positioned in groups in the battery module 210. The modular clips can be aligned in a second linear direction perpendicular to the first linear direction of the battery cells 402 within a single clip 304.

Notably, the modular clips 304 for battery modules 210 can improve the performance and reduce the cost of a battery pack 102 with battery modules 210. Specifically, the battery pack 102 having battery modules with modular clips 304 can help to ramp up production of electric batteries for various applications, e.g., including battery packs for electric vehicles and/or energy storage applications, in order to reach the mass market.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Furthermore, relative terms such as "lower," "bottom," "top," "upper," etc. may be used to describe an element's relationship to another element, as illustrated in the examples in the drawings. It will be understood that relative terms are intended to encompass different orientations of an apparatus in addition to the orientation depicted in the drawings. By way of example, if an apparatus in the drawings is turned over, elements disclosed as being on the "bottom" or "lower" would be on the "top" or "upper" and elements described as being on the "top" or "upper" would be on the "bottom" or "lower." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A modular clip for a battery module, the modular clip comprising:
   a housing configured to receive a plurality of battery cells, the housing including
      a clip shell including:
         a base portion including at least one row of a plurality of bottom cell recesses, each of the plurality of bottom cell recesses configured to receive a battery cell and shaped to surround a perimeter of the battery cell;
         a first wall extending from the base portion; and
         a second wall extending from the base portion and spaced from the first wall; and
      a retainer plate including a plurality of top cell recesses aligned with the plurality of bottom cell recesses of the base portion, wherein each of the plurality of top cell recesses comprises a first opening extending through the retainer plate and shaped to provide electrical access to a corresponding battery cell if the corresponding battery cell is received in the clip shell, wherein the modular clip is configured to be a sub-module of the battery module.

2. The modular clip of claim 1, wherein the plurality of bottom cell recesses are aligned along a first linear direction.

3. The modular clip of claim 1, wherein a first subset of the plurality of bottom cell recesses are aligned along a first linear direction, and wherein a second subset of the plurality of bottom cell recesses are aligned along a second linear direction parallel to the first linear direction, wherein the second subset of bottom cell recesses comprise a staggered position relative to the first subset of bottom cell recesses.

4. The modular clip of claim 1, wherein the first wall and the second wall comprise a curved shape, and wherein the plurality of bottom cell recesses are aligned along a curved direction.

5. The modular clip of claim 1, wherein each of the plurality of bottom cell recesses has a depth between approximately 2 mm to ⅓ of a height of the modular clip.

6. The modular clip of claim 1, further comprising at least one interconnect plate configured to connect at least a subset of the plurality of battery cells to a controller board.

7. The modular clip of claim 1,
wherein the plurality of top cell recesses are aligned with the plurality of bottom cell recesses, and wherein a corresponding top cell recess and bottom cell recess are configured to receive one of the plurality of battery cells.

8. The modular clip of claim 7, wherein each of the plurality of bottom cell recesses comprises a first opening extending through the base portion.

9. The modular clip of claim 7, wherein each of the plurality of top cell recesses comprises an indent shaped to surround a portion of an exterior of a battery cell.

10. The modular clip of claim 7, wherein the retainer plate further comprises:
a plurality of heat stakes and a plurality of locating buttons, the plurality of heat stakes and the plurality of locating buttons configured to align and connect the retainer plate to at least one of a plurality of interconnect plates.

11. The modular clip of claim 7, wherein the retainer plate further comprises a plurality of holes positioned to align and connect the retainer plate to at least one of a plurality of interconnect plates disposed at a side of a battery module.

12. The modular clip of claim 1, wherein the clip shell further includes:
an opening extending through a portion of the clip shell configured to receive a fastener that holds the clip shell to a base plate, wherein the opening further comprises a compression restriction component positioned within the opening.

13. The modular clip of claim 1, further comprising:
a plurality of battery cells positioned in at least a portion of the bottom cell recesses.

14. The modular clip of claim 6, wherein the retainer plate is configured to receive at least one interconnect plate, and wherein the opening is configured to enable the interconnect plate to couple the battery cell to a controller board.

15. A battery module for a battery pack assembly, the battery module comprising:
a base plate; and
a plurality of modular clips coupled to the base plate, each of the plurality of modular clips including:
a housing configured to receive a plurality of battery cells, the housing including:
a clip shell including:
a base portion including at least one row of a plurality of bottom cell recesses, each of the plurality of bottom cell recesses configured to receive a battery cell and shaped to surround a perimeter of the battery cell;
a first wall extending from the base portion; and
a second wall extending from the base portion and spaced from the first wall; and
a retainer plate including a plurality of top cell recesses aligned with the plurality of bottom cell recesses of the base portion, wherein each of the plurality of top cell recesses comprises a first opening extending through the retainer plate and shaped to provide electrical access to a corresponding battery cell if the corresponding battery cell is received in the clip shell, wherein the modular clip is configured to be a sub-module of the battery module.

16. The battery module of claim 15,
wherein the plurality of top cell recesses are aligned with the plurality of bottom cell recesses.

17. The battery module of claim 15, wherein each of the plurality of modular clips further comprises:
at least one interconnect plate configured to couple at least a subset of the plurality of battery cells to at least one controller board through a corresponding opening of the retainer plate.

18. The battery module of claim 17, further comprising:
at least one controller board coupled to the at least one interconnect plate.

19. The battery module of claim 17, wherein the at least one interconnect plate comprises a strip shaped interconnect plate.

20. The battery module of claim 17, wherein the at least one interconnect plate is coupled to the at least one controller board via at least one voltage sensing PCB.

21. The battery module of claim 15, wherein the plurality of bottom cell recesses are aligned along a first linear direction in each of the plurality of modular clips, and wherein the plurality of modular clips are aligned in a second linear direction perpendicular to the first linear direction.

22. The battery module of claim 15, wherein the battery module comprises multiple electrical modules sharing the same plurality of modular clips, each electrical module comprising:
a plurality of battery cells received in a subset of the bottom cell recesses of the plurality of modular clips;
a plurality of interconnect plates extending across a portion of the modular clips, the portion corresponding to the subset of the bottom cell recesses,
wherein the multiple electrical modules are coupled via a bus bar.

23. The battery module of claim 22, wherein battery cells within the subset of the bottom cell recesses of a modular clip in each electrical module are connected in parallel, and wherein modular clips within each electrical module are connected in series, and wherein the multiple electrical modules are connected in series.

24. The battery module of claim 15, wherein the plurality of modular clips comprises between 2 to 24 modular clips.

25. The battery module of claim 15, further comprising a plurality of battery cells positioned in at least a portion of the bottom cell recesses.

26. A battery pack comprising:
a plurality of battery modules, each battery module including:
a plurality of modular clips, each modular clip including:
a housing configured to receive a plurality of battery cells, the housing including:
a base portion including at least one row of a plurality of bottom cell recesses, each of the plurality of bottom cell recesses configured to receive a battery cell and shaped to surround a perimeter of the battery cell;

a first wall extending from the base portion; and a second wall extending from the base portion and spaced from the first wall; and a retainer plate including a plurality of top cell recesses aligned with the plurality of bottom cell recesses of the base portion, wherein each of the plurality of top cell recesses comprises a first opening extending through the retainer plate and shaped to provide electrical access to a corresponding battery cell if the corresponding battery cell is received in the housing, wherein the modular clip is configured to be a sub-module of the battery module.

27. The battery pack assembly of claim 26, wherein the plurality of top cell recesses are aligned with the plurality of bottom cell recesses, and wherein the retainer plate is configured to receive at least one interconnect plate, and wherein the opening is configured to enable the interconnect plate to couple the battery cell to a controller board.

28. The battery pack assembly of claim 26, wherein each modular clip further comprises:

at least one interconnect plate configured to couple at least a subset of the plurality of battery cells to at least one controller board through a corresponding opening of the retainer plate.

29. The battery pack of claim 26, wherein each battery module further comprises multiple electrical modules sharing the same plurality of modular clips, each electrical module comprising:

a plurality of battery cells received in a subset of the bottom cell recesses of the plurality of modular clips;

a plurality of interconnect plates extending across a portion of the modular clips, the portion corresponding to the subset of the bottom cell recesses, wherein the multiple electrical modules are coupled via a bus bar.

30. The battery pack of claim 26 further comprising:

a plurality of battery cells positioned in at least a portion of the bottom cell recesses.

* * * * *